US006309301B1

United States Patent
Sano

(10) Patent No.: US 6,309,301 B1
(45) Date of Patent: Oct. 30, 2001

(54) GAME COMMUNICATION WITH SYNCHRONIZATION OF SOUNDTRACK SYSTEM

(75) Inventor: Nobuyoshi Sano, Kawasaki (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/396,806

(22) Filed: Sep. 14, 1999

(30) Foreign Application Priority Data

Aug. 10, 1998 (JP) .................................. 10-322791
Sep. 14, 1998 (JP) .................................. 10-299024
Nov. 9, 1998 (JP) .................................. 10-353753

(51) Int. Cl.[7] ...................................................... A63F 13/00
(52) U.S. Cl. ................................ 463/35; 463/40; 463/41; 434/307 R; 434/308
(58) Field of Search ................................ 463/35, 30, 40, 463/41, 42, 43, 33, 6, 37; 381/17, 18, 19, 20, 21, 22; 345/418, 425, 433; 709/217, 218, 227, 228; 434/307 R, 307 A, 308, 309

(56) References Cited

U.S. PATENT DOCUMENTS

| Re. 33,559 | * | 3/1991 | Fallacaro et al. | 434/307 A |
|---|---|---|---|---|
| 4,490,810 | * | 12/1984 | Hon | 434/308 |
| 4,571,640 | * | 2/1986 | Baer | 434/323 |
| 5,149,104 | * | 9/1992 | Edelstein | 463/35 |
| 5,390,938 | * | 2/1995 | Takeya | 463/35 |
| 5,393,073 | * | 2/1995 | Best | 463/35 |
| 5,462,275 | * | 10/1995 | Lowe et al. | 463/30 |
| 5,556,107 | * | 9/1996 | Carter | 463/35 |
| 5,577,185 | * | 11/1996 | Tunnell et al. | 463/33 |
| 5,862,229 | * | 1/1999 | Shimizu | 381/17 |
| 5,947,746 | * | 9/1999 | Tsai | 434/307 A |
| 5,980,261 | * | 11/1999 | Mino et al. | 434/307 A |
| 6,010,403 | * | 1/2000 | Adam et al. | 463/6 |
| 6,028,593 | * | 2/2000 | Rosenberg et al. | 463/37 |
| 6,134,590 | * | 10/2000 | Perlman | 709/228 |
| 6,149,523 | * | 11/2000 | Yamada et al. | 463/31 |
| 6,183,367 | * | 2/2001 | Kaji et al. | 463/42 |
| 6,193,520 | * | 2/2001 | Okamoto | 434/307 A |

* cited by examiner

Primary Examiner—Michael O'Neill
(74) Attorney, Agent, or Firm—Morrison & Foerster LLP

(57) ABSTRACT

A game communication system enhancing and improving clarity of players perception of a game. The game communication system includes gaming machine units connected to each other through communication modules which are adapted to perform a communication procedure within the game communication system. Each of the gaming machine units includes communication units adapted to execute the communication procedure to ensure bi-directional communications among the gaming machine units, a performance unit performing a sound track for a corresponding gaming machine unit, and a synchronization data setting unit setting a synchronization data which is used to control operation timing of the performance unit.

21 Claims, 24 Drawing Sheets

```
······
LABEL#1
        WAVE    ····
        VOL     ····
        PLAY    ····
······
LABEL#2
        WAVE    ····
        VOL     ····
        PLAY    ····

```
······
short table[]={51,105,159};
        for(i=0;i<MAX;i++){
                if(table[i]==counter)
                        Request(label#[i]);}
······
```

FIG. 7B

```
·······
      table = (100,90,80,70)
check
      GET member
      VOL = table[member]

LABEL#1
      WAVE ····
      PLAY ····
      VOL  100
······
LABEL#2
      WAVE ····
      VOL  90
      PLAY ····
······
```

```
······
short table[]={100,90,80,70};
      if(CheckMaxsong(songnumber)){
             SetVolume(table[member]);}

Request(songnumber);
······
```

FIG.9

```
......
      table = (51,105,159)

check

GET counter
      IF counter == table[0] THEN LABEL#2
      IF counter == table[1] THEN LABEL#3
      IF counter == table[2] THEN LABEL#4
      GOTO check

LABEL#1
      WAVE ....
      VOL  ....
      PLAY ....

......
LABEL#2
      WAVE ....
      VOL  ....
      PLAY ....

"B" IN THE FIGURES MEANS "BLOCK"

BLOCK STRUCTURE

| GLOBAL PAN DATA | BOARD NO. 0 | BOARD NO. 1 | BOARD NO. 2 | BOARD NO. 3 |
|---|---|---|---|---|
| LL | LL | OFF | OFF | OFF |
| L | RR | LL | OFF | OFF |
| C | OFF | RR | LL | OFF |
| R | OFF | OFF | RR | LL |
| RR | OFF | OFF | OFF | RR |

FIG. 26

| ID NO. | BALANCE | VOLUME |
|---|---|---|
| #0 | LL | 100% |
| #1 | OFF | OFF |
| #2 | OFF | OFF |
| #3 | OFF | OFF |

FIG. 27

| ID NO. | BALANCE | VOLUME |
|---|---|---|
| #0 | RR | 100% |
| #1 | LL | 100% |
| #2 | OFF | OFF |
| #3 | OFF | OFF |

FIG. 28

| ID NO. | BALANCE | VOLUME |
|---|---|---|
| #0 | OFF | OFF |
| #1 | RR | 100% |
| #2 | LL | 100% |
| #3 | OFF | OFF |

FIG. 29

| ID NO. | BALANCE | VOLUME |
|---|---|---|
| #0 | OFF | OFF |
| #1 | OFF | OFF |
| #2 | RR | 100% |
| #3 | LL | 100% |

FIG. 30

| ID NO. | BALANCE | VOLUME |
|---|---|---|
| #0 | OFF | OFF |
| #1 | OFF | OFF |
| #2 | OFF | OFF |
| #3 | RR | 100% |

FIG. 31

| GLOBAL PAN DATA | BOARD NO. 0 | BOARD NO. 1 |
|---|---|---|
| LL | LL | OFF |
| L | C | OFF |
| C | RR | LL |
| R | OFF | C |
| RR | OFF | RR |

FIG. 32

GAME COMMUNICATION WITH SYNCHRONIZATION OF SOUNDTRACK SYSTEM

FIELD OF THE INVENTION

The invention relates to a game communication system including gaming machine units connected to each other through a communication link. More particularly, the invention relates to a game communication system including gaming machine units adapted to play sound tracks as background music ("BGM").

BACKGROUND OF THE INVENTION

Game communication systems have been made available in recent years in which gaming machine units are connected to each other through a communication link. Players operating the respective gaming machine units are able to enjoy playing games in a common game field. An example of such a game communication system is disclosed in Japanese Laid-Open Patent No. 11-033230.

Typical gaming machine units of the game communication system include speaker channels for reproducing stereophonic sounds and sound tracks, for example, through speakers as BGM during the game. The purpose of stereo BGM is to make the games more enjoyable and exciting by stimulating the player's auditory sense as well as his or her visual sense.

The conventional game communication systems, however, only supply performance commands to the printed circuit board mounted in each gaming machine unit. The game communication systems do not provide control of the printed circuit boards so as to reproduce the sound tracks synchronously at each of the gaming machine units. A delay in the performance timing among the printed circuit boards associated with data communication, for example, may cause the sound tracks for the BGM to be out of sync. The delay of performance timing performed or reproduced by the printed circuit boards may also be caused by a difference in timing when a coin or token is inserted. As a result, the sound field provided through the game communication system becomes muffled. Hence, the performance or reproduction of the sound tracks as BGM does not contribute to the auditory enhancement of the game.

In addition, the conventional game communication systems are capable of performing/reproducing only a limited number of BGM sound tracks. The sound tracks are performed/reproduced in a predetermined order. In this regard, the identical sound tracks are repeatedly performed/reproduced. Again, this does not contribute to the auditory enhancement of the game.

Conventional game communication systems deal with each gaming machine unit as a single sound system (Japanese Laid-Open Patent No. 8-172700). Under such circumstances, the performance or reproduction of the sound tracks as BGM does not improve the sound effects since the communication system is considered as a single sound system having gaming machine units connected to each other.

As an example, the same sound field is provided in each gaming machine unit, wherein the sound fields are a reproduction of the same melody. As a result, the sound available in the entire game communication system does not provide good spatial effects. Therefore, even (for example, movies, films and/or demonstrations displayed on the gaming machine units in an attraction mode that are out of game play), will not acoustically attract a person to play the game when he or she is visually away from the gaming machine units. Moreover, when players simultaneously encounter an event (e.g., a jet plane passes by a cartoon in the gaming field during game play) in the same gaming field during game play, the depth of the gaming field cannot be produced acoustically as a sound effect.

SUMMARY OF THE INVENTION

A feature of the invention is to provide a clearer sound field for the game communication system, thereby giving players a better presentation of the game. Another feature of the invention is to change, depending on the game status, sound tracks performed/reproduced by the gaming machine units of the game communication system, thereby providing a clearer sound effect for the players from a productive viewpoint.

Yet another feature of the invention is to create a clearer effect from the productive viewpoint in the entire game communication system by collectively using, as a single piece of music for the entire game communication system, the sound tracks performed/reproduced as BGM by the gaming machine units of the game communication system.

Still another feature of the invention is to create a clearer sound effect from the productive viewpoint by providing a sound field with quality spatial effects in the entire game communication system.

A game communication system in accordance with one embodiment of the invention provides clarity of a sound field by providing clearer sound to a player. The game communication system includes, for example, a performance data memory 80 storing a performance data train 82 which forms a sound track, the performance data train 82 being separated into segments, each segment bearing a label; a correspondence table 81 including counter values and labels; a sequencer 40 for use in selecting the label corresponding to the position where the performance started, according to a counter value obtained and based on the progress of the sound track performed by the gaming machine unit set to a master mode and a counter value defined in correspondence table 81; and a PCM sound source 50 for use in performing the sound track starting from the performance data at the position corresponding to the label chosen by sequencer 40.

The invention relates to, depending on a game status, changing sound tracks performed/reproduced by the gaming machine units of the game communication system and to collectively use, as a single piece of music, the sound tracks performed in the entire game communication system, thereby creating clearer sound effects for players from the productive viewpoint.

Another embodiment of the game communication system of the invention includes a performance data memory 80 storing a performance data train 82 which forms a sound track; a main central processing unit (CPU) 20 adapted to detect a status of the game for each gaming machine unit; a sequencer 40 for use in selecting a sound track suitable for the game status informed by main CPU 20 from those stored in performance data memory 80; and a PCM sound source 50 adapted to perform the sound track selected by sequencer 40 at gaming machine units in a synchronous manner.

Another embodiment of the game communication system of the invention includes a plurality of gaming machine units connected to each other through communication modules 10 in order to enhance productive sound effects by providing good spatial effects in the sound field formed in the entire game communication system; a pan table memory 5 adapted to generate a pan data, the pan data being used for setting a global pan depending on the number of gaming machine units connected; and a main CPU 20 for use in controlling an analog audio signal generating circuit 6 and a mixer 7 according to the pan data supplied from pan table memory 5.

BRIEF DESCRIPTION OF THE DRAWINGS

FIG. 7 is a schematic representation of a sequencer program used in the first embodiment of the invention;

FIG. 9 is a schematic representation of a sequencer program used in the second embodiment of the invention;

FIG. 15 is a schematic representation of a sequencer program carried out in the first modification;

FIG. 26 is a view illustrating an example of a global pan table used in the third embodiment of the invention;

FIG. 27 is a schematic representation of a local pan table used in the third embodiment of the invention;

FIG. 28 is another schematic representation of the local pan table used in the third embodiment of the invention;

FIG. 29 is another schematic representation of the local pan table used in the third embodiment of the invention;

FIG. 30 is another schematic representation of the local pan table used in the third embodiment of the invention;

FIG. 31 is another schematic representation of the local pan table used in the third embodiment of the invention; and FIG. 32 is a view illustrating another example of the global pan table.

DETAILED DESCRIPTION OF THE INVENTION

The invention is implemented in a game communication system in which gaming machine units are connected to each other via communication lines to achieve a certain purpose. The following preferred embodiments of the invention are described in conjunction with the game communication system which includes gaming machine units each having a control panel.

First Embodiment of the Invention

A first embodiment of the invention is now described in detail with reference to the drawings.

A game communication system according to the first embodiment includes, for example, a plurality of gaming machine units arranged side by side in, for example, a game arcade. Each gaming machine unit has a display device such as a video screen and a control panel for multiple players, both of which are mounted on the front surface of a housing. A predetermined printed circuit board is provided within the housing.

Figure 1:
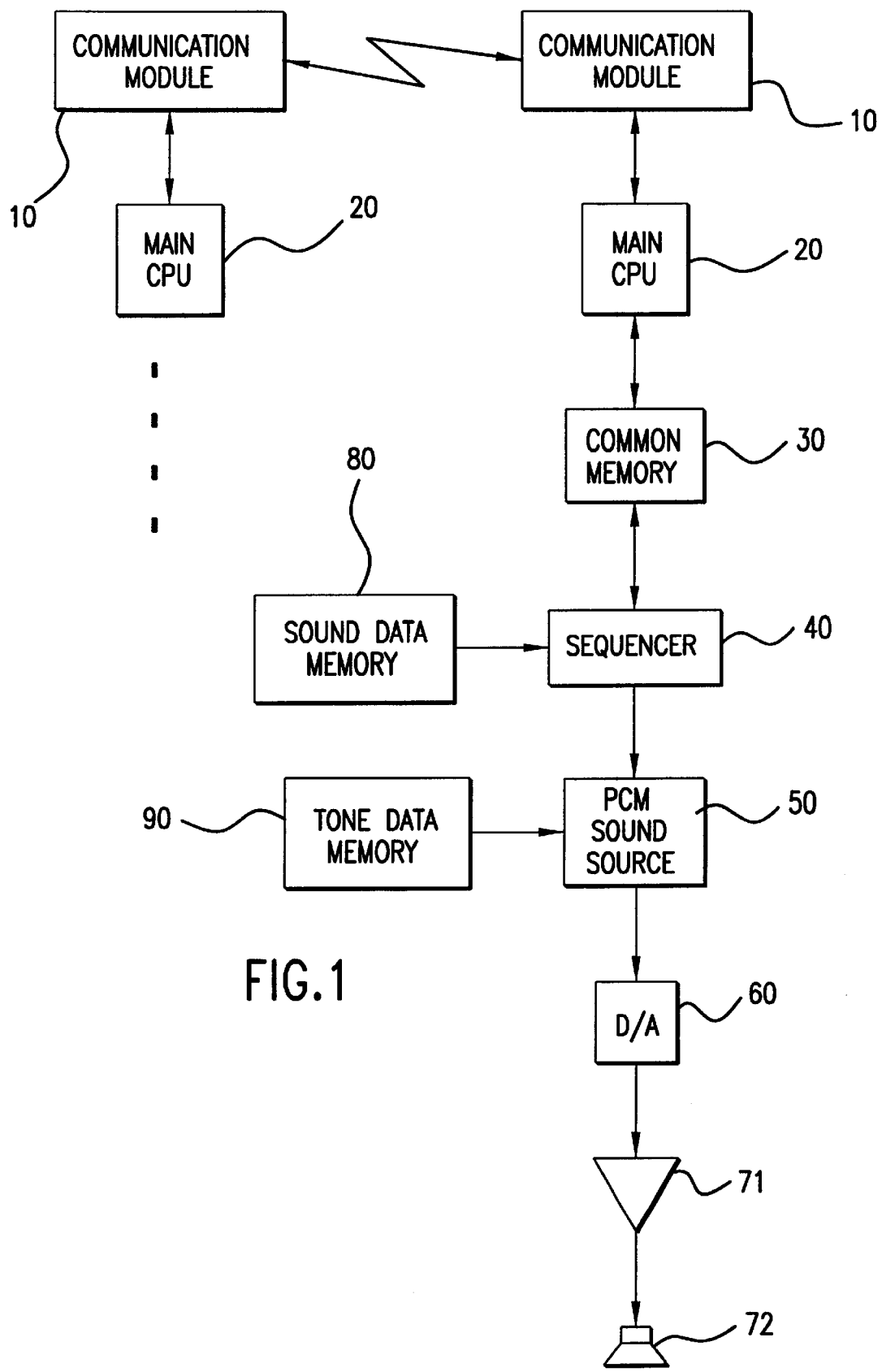
FIG. 1 depicts a block diagram illustrating a schematic configuration of a game communication system which is commonly applicable to the embodiments of the invention.
Figure 6:
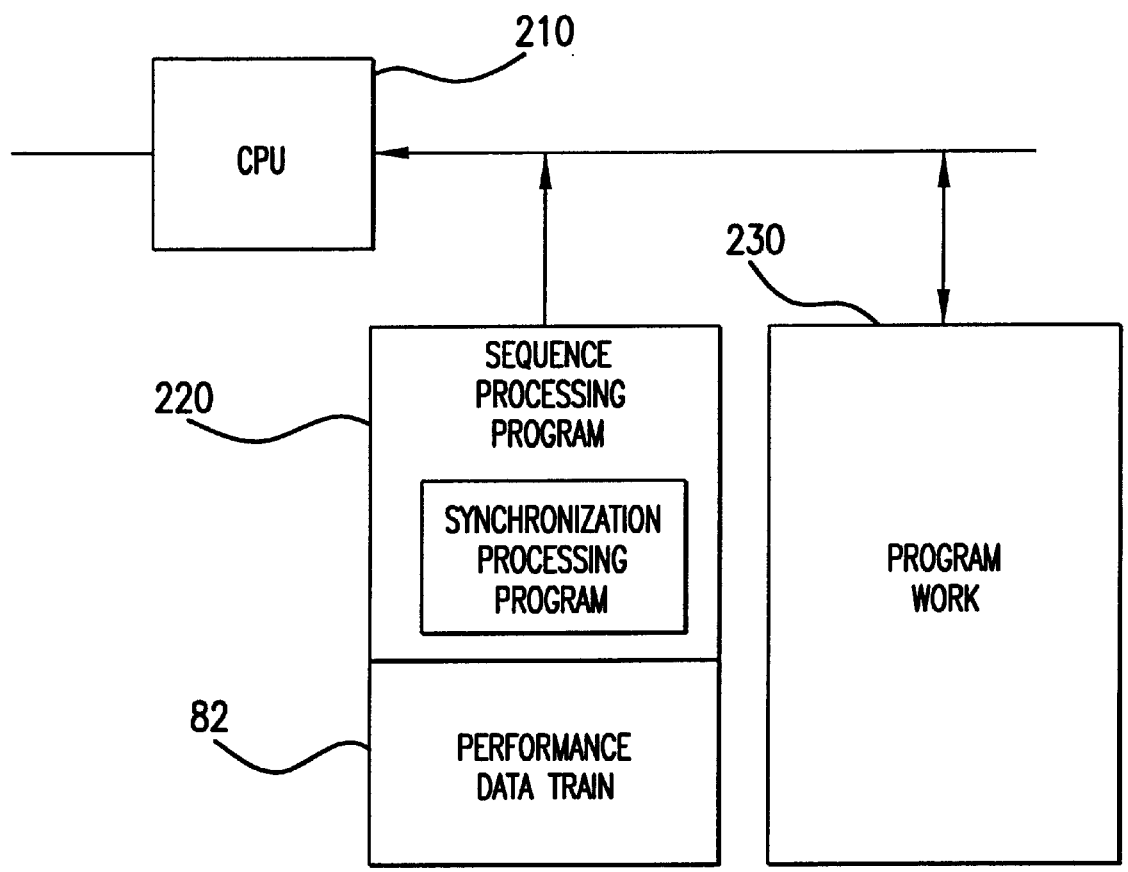
FIG. 6 depicts a block diagram illustrating peripheries of a sequencer according to the first embodiment of the invention.

FIG. 1 depicts a block diagram illustrating a schematic configuration of a game communication system which is commonly applicable to the embodiments of the invention. FIG. 6 depicts a block diagram illustrating peripheries of a sequencer according to the first embodiment of the invention. FIG. 7 is a schematic representation of a sequencer program used in the first embodiment of the invention.

The block diagram in FIG. 1 shows a plurality of gaming machine units connected to each other through communication lines. Not all of the gaming machine units are illustrated as being connected to each other since they may be connected in a manner similar to the first two gaming machine units.

As shown in FIG. 1, the printed circuit board mounted in the gaming machine unit is connected to a communication module 10, main CPU 20, a common memory 30, a sequencer 40, a pulse code modulation (PCM) sound source 50, a digital-to-analog (D/A) converter 60, a performance (sound) data memory 80 and a tone data memory 90. An amplifier 71 and a speaker 72 are connected to D/A converter 60 via lead lines. Configurations of these components are described schematically below. The term "performance" is referring to the reproduction (playing) of the sound tracks, musical pieces and any other music and/or sounds. Likewise, the term "perform" means to reproduce (play) the sound tracks, musical pieces and any other music and/or sounds.

It is noted that FIG. 1 depicts a block diagram illustrating schematically functions of the game communication system according to the first embodiment, while FIG. 6 illustrates a specific example of sequencer 40 and performance data memory 80 according to the first embodiment.

Communication module 10 corresponds to an example of the communication unit. Communication module 10 stores a communication protocol which administers data communication among the printed circuit boards. Communication module 10 may be provided as, for example, a common module on which the communication protocols are stored for both a master printed circuit board and slave printed circuit boards.

Figure 2:
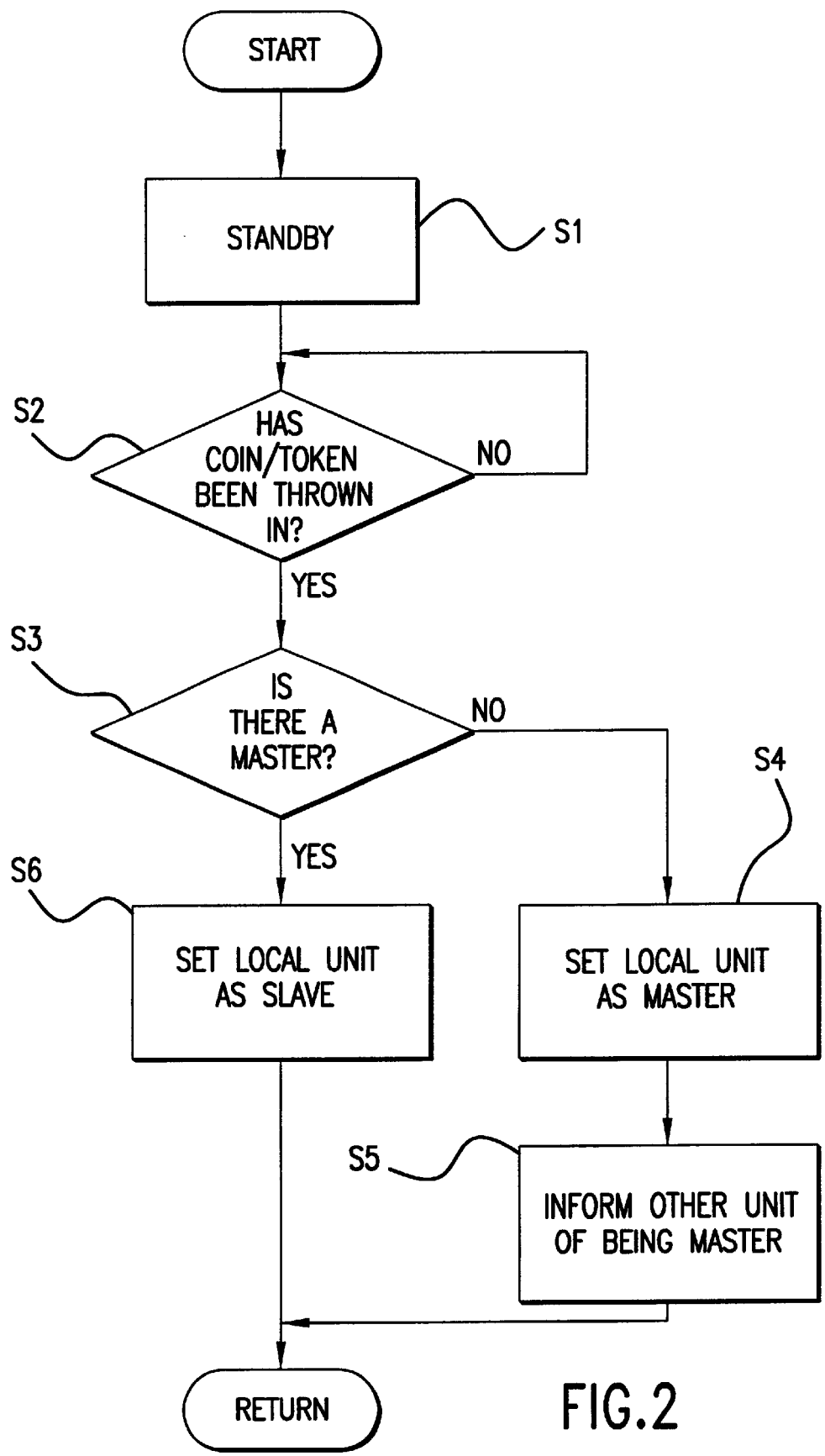
FIG. 2 depicts a flow chart illustrating a master-slave allocation routine for use in a sound track performance operation commonly applicable to the embodiments of the invention.

Main CPU 20 carries out an automatic master-slave allocation routine (described below in conjunction with FIG. 2). When the entire system is energized by the printed circuit boards associated with each other (via communication lines), the master-slave allocation routine stored on the printed circuit board is performed. This routine establishes a master mode of a subsequent communication operation at the gaming machine unit which has received a token, and establishes a slave mode of communication at the remaining gaming machine units. In this embodiment, the description is made with the assumption that the master and slaves for the communication operation are the master and slaves for a sound track performance operation, respectively. However, the invention is not limited to the above-mentioned configuration. The master for the communication operation may be used as a slave for the sound track performance operation. In such a case, main CPU 20 sets the master or slaves for the sound track performance operation.

Main CPU 20 corresponds to mode allocating unit and status detecting unit. Main CPU 20 controls the gaming machine units by controlling the communication management, gaming procedure and game status management, and operation of sequencer 40. Main CPU 20 controls operations carried out by sequencer 40 by writing, for example, a command in common memory 30.

Main CPU 20 is connected to, for example, two control panels, a coin throw sensor, and a start button, which are not shown in the figure.

Common memory 30 is a memory commonly used for main CPU 20 and sequencer 40. Common memory 30 is provided with a counter 31 (FIG. 5) for holding a counter value indicative of a track time of a sound track performed by the gaming machine unit set to the master mode. The counter value serves as synchronizing data for use in synchronizing the timing of the sound track performance operations.

Sequencer 40 forms a major portion of the performance unit performing sound tracks. A specific example of a sequencer configuration is described with reference to FIGS. 5 and 6. Sequencer 40, for example, includes a CPU 210, a read only memory (ROM) 220 and a random access memory (RAM) 230, as shown in FIG. 6. ROM 220 includes, for example, a program represented by a flowchart in FIG. 3 or FIG. 4. RAM 230 serves as a program work area. Sequencer 40 supplies a performance data train to PCM sound source 50 to carry out the sound track performance operation while achieving synchronization according to the routine of the flowcharts shown in FIGS. 3 and 4.

CPU 210 has a timer capable of counting each single frame and carries out the counting operation only when it is set to the master mode. The single frame used herein means the smallest segment of time that can be processed by the hardware of the type described in this embodiment, for example, 1/60 of a second.

In this embodiment, counting is first made based on the smallest segment of time that can be processed by the hardware to allow precise correction of delay due to the communication, if any, between the printed circuit boards. This approach also allows flexibility with communication delay variation due to a change in communication topology and/or a communication protocol. In this embodiment, the communication topology used is a bus based topology. However, the invention is not limited thereto, and other topologies such as a ring topology or a star topology may be used to solve the problem of communication delay among the printed circuit boards in the gaming machine units.

PCM sound source 50 reads tone data from tone data memory 90 according to the data received from sequencer 40 to produce sound data. PCM sound source 50 is capable of generating a digital sound, adjusting the volume and setting a pan, and mixing, thereby producing left (L) channel sound data and right (R) channel sound data. The term "sound data" is referred to as data obtained by means of synthesizing the tone data based on the performance data.

D/A converter 60 converts the digital sound data into an analog music signal and supplies it to amplifier 71. The music signal amplified by amplifier 71 is played through speaker 72. Though FIG. 1 shows only a single combination of amplifier 71 and speaker 72, the system in practice includes a pair of amplifiers 71 and speakers 72 for the L and R channels to play the sounds in stereo.

Performance data memory 80 is a memory containing the performance data train. A specific configuration of performance data memory 80 in this embodiment is described below with reference to FIGS. 6 and 7. Performance data train 82 has music note data stored in a predetermined area in ROM 220 (FIG. 6) which corresponds to the performance data memory, as shown in FIG. 7(a). A correspondence table 81 (FIG. 5) and a performance starting checking routine for use in checking values in the table are realized as a part of a sequencer program stored in the predetermined area of ROM 220 (FIG. 6) which corresponds to performance data memory 80, as shown in FIG. 7(b).

Tone data memory 90 is a memory storing sampled sound data to be used for PCM sound source 50 such as sound data obtained by sampling the sounds of a piano or a violin. Alternatively, the sound data may be obtained by sampling sound effects such as sounds of waves, raindrops or animal boom. In this event, the sound effects may be generated in such a manner that a plurality of gaming machine units are synchronized with each other.

A procedure for automatic allocation of the master-slave for the sound track performance operation is described with reference to FIG. 2. FIG. 2 depicts a flow chart illustrating a master-slave allocation routine for use in sound track performance operation which is commonly applicable to the embodiments of the invention. When the system is turned on, the master-slave allocation routine is carried out in the printed circuit boards mounted in the respective gaming machine units. A hardware standby operation is carried out in the printed circuit boards (step S1). This standby operation involves switching the mode of each communication module 10 into a reset mode.

Main CPU 20 determines whether a coin or a token is inserted into the unit (Step S2). If step S2 indicates that the coin or token has been inserted into the system, then main CPU 20 determines whether there is any communication module 10 already set to the master mode (step S3). If step S3 indicates that there is no communication module 10 already set to the master mode, then main CPU 20 carries out an operation to set the local communication module 10 to a master mode (step S4). Main CPU 20 informs other gaming machine units that the local gaming machine unit where the informing main CPU 20 is located is set as the master (step S5). Thus, main CPU 20 renders the local gaming machine unit as the master to carry out the communication protocol for the master printed circuit board.

On the other hand, if step S3 indicates that there is already a master, then main CPU 20 carries out an operation to set local communication module 10 to a slave mode (step S6). Thus, main CPU 20 renders the local gaming machine unit as the slave to activate the communication protocol for the slave printed circuit board. When the operation at step S5 or S6 is complete, main CPU 20 finishes this routine. As described above, according to this embodiment, the gaming machine unit which receives the coin or token first serves as the master for the sound track performance operation for the gaming machine units connected to each other through the communication lines.

Figure 3:
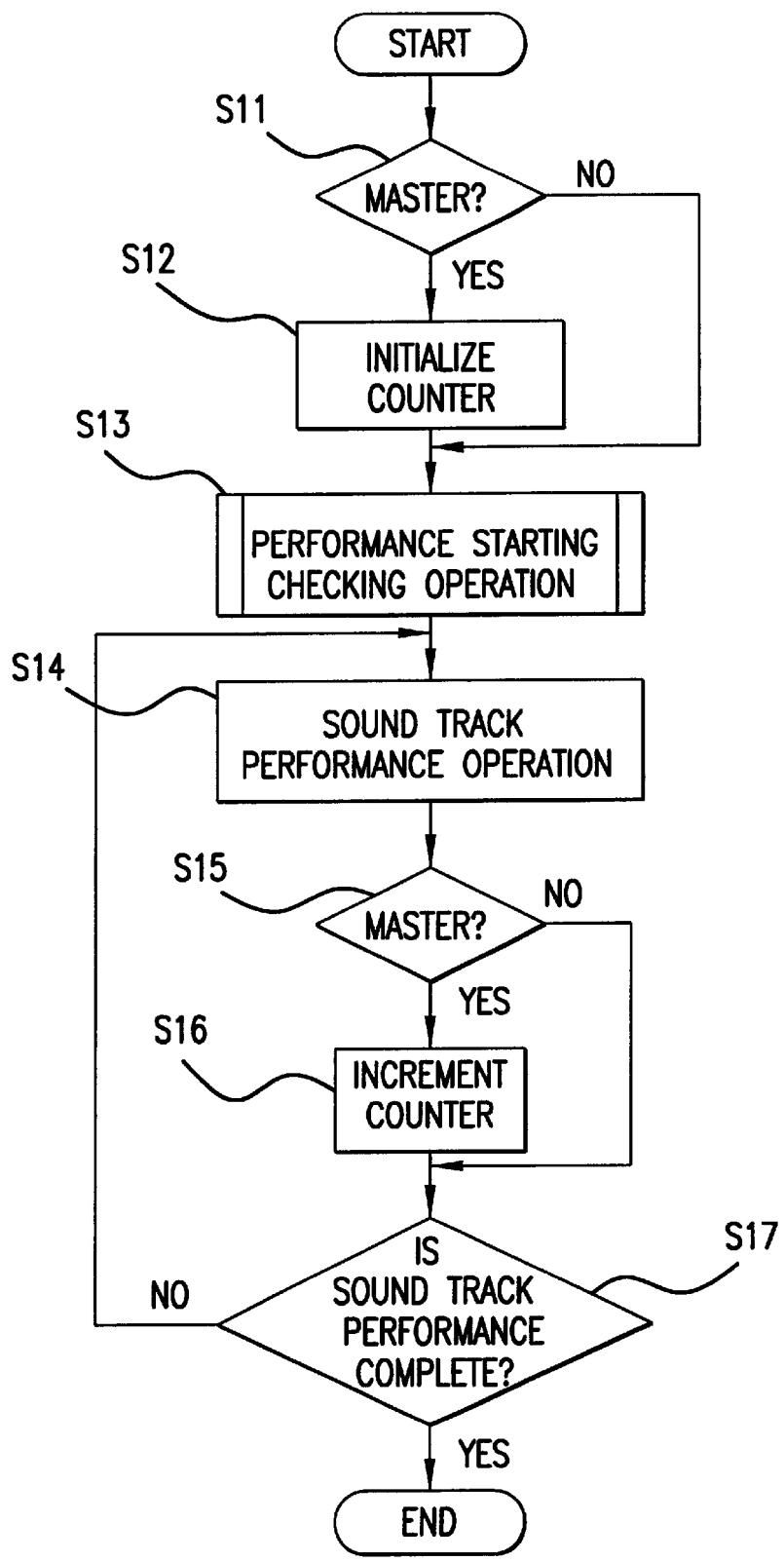
FIG. 3 depicts a flow chart illustrating a sound track performance routine carried out in a first embodiment of the invention.
Figure 4:
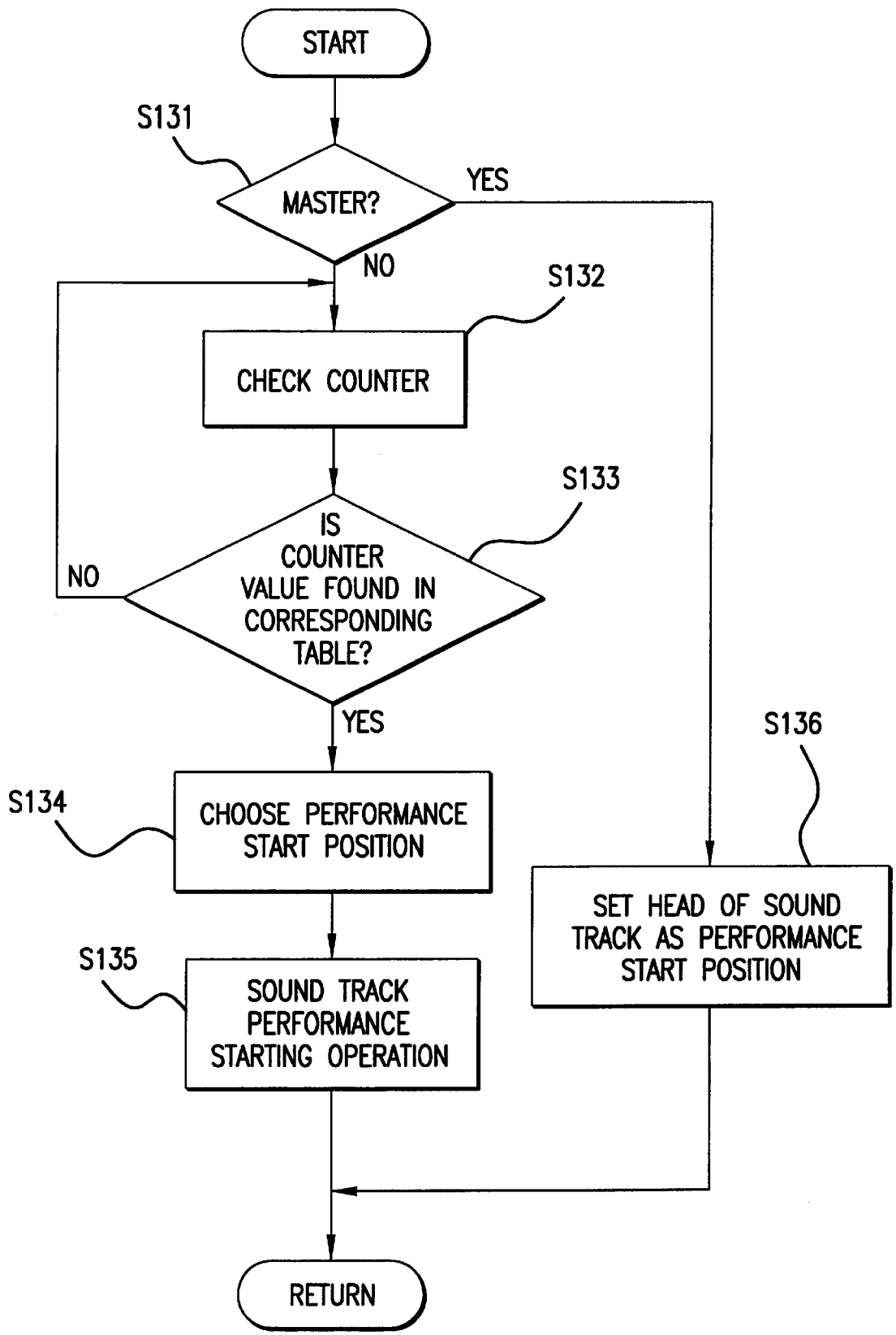
FIG. 4 depicts a flow chart illustrating a performance starting checking sub-routine carried out in the first embodiment of the invention.
Figure 5:
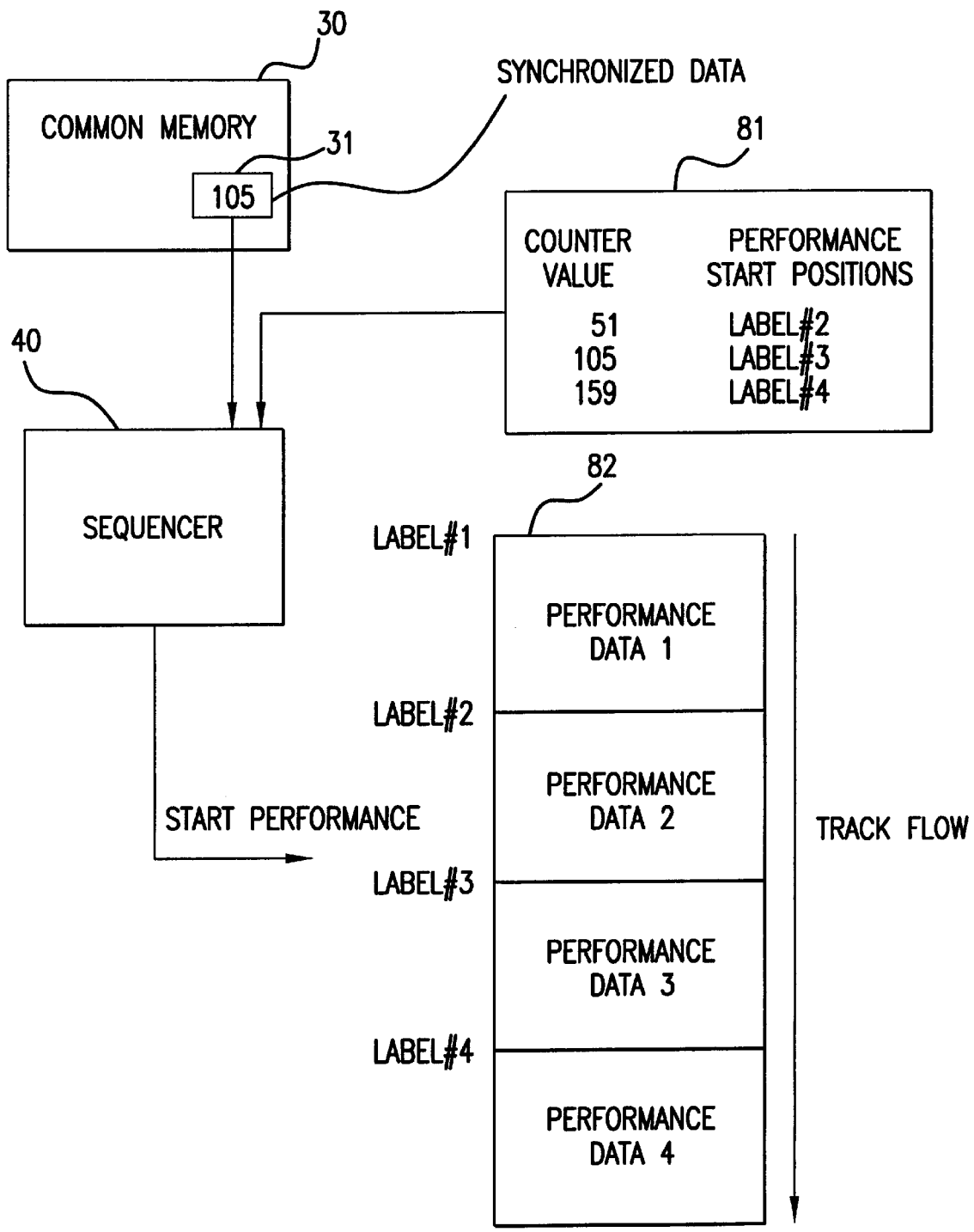
FIG. 5 depicts a data flow diagram illustrating a performance status in a gaming machine unit set to a slave mode according to the first embodiment of the invention.

FIG. 3 depicts a flow chart illustrating a sound track performance routine carried out in a first embodiment of the invention. FIG. 4 depicts a flow chart illustrating a performance starting checking sub-routine carried out in the first embodiment of the invention. FIG. 5 depicts a data flow diagram illustrating a performance status in the gaming machine unit set to the slave mode according to the first embodiment of the invention.

The flow of the data during the sound track performance operation in the gaming machine units when set to the slave mode is described first with reference to FIG. 5. The flow charts in FIGS. 3 and 4 will be described later.

In FIG. 5, correspondence table 81 is a table holding counter values and labels indicative of positions at which the performance is initiated in the gaming machine unit set to the slave mode. The time duration corresponding to the half measure in this embodiment is approximately equal to 0.9 seconds, which corresponds to 54 frames. In this embodiment, a communication delay among the circuit boards of three frames may be caused by, for example, the communication protocol. As can be seen from correspondence table 81, the counter values are set as 51 frames, 105 frames, 159 frames, etc., by subtracting three frames from the counter value at the first half measure. This makes it possible to start performance of a sound track while taking into consideration the delay among the printed circuit boards in the gaming machine units set in the slave mode. Performance data train 82 is stored in performance data memory 80.

Performance data train 82 may include, for example, score data indicative of a score and data for use in controlling PCM sound source 50. Performance data train 82 is separated into performance data 1, performance data 2, performance data 3 and performance data 4 of every data amount corresponding to 0.9 seconds, i.e., the half measures.

Four labels are inserted into the heads of the four performance data, respectively. The labels are: LABEL #1, LABEL #2, LABEL #3 and LABEL #4. Reading the performance data at the position indicated by the LABEL #N results in starting a sound track from any one of the half measure positions. Performance data train 82 includes the note data, since the note data can be used advantageously to control the total track time of separating the performance data train by the labels.

In this embodiment, performance data train 82 is separated by every half measure. This results in a wait time duration no longer than 1 second. The full measure of the sound track employed as the BGM herein is equal to, for example, 1.8 seconds and the half measure thus meets the above requirement. It is noted that the invention is not limited to the embodiment with performance data train 82 separated by every half measure, as long as the time duration will not cause people to feel as if they are being kept waiting. For example, the time duration may be one third measure for a triple time sound track (in other words, a piece of music with a rhythm of three beats in each measure).

The sound track performance operation is described with reference to FIGS. 3 and 4 where a gaming machine unit is set in the master mode. When a gaming machine unit is set to the master mode in the master-slave allocation routine in FIG. 2 and the sound track performance routine in FIG. 3 is initiated, sequencer 40 determines at step S11 whether the local gaming machine unit is in the master mode and initializes the counter value to zero (step S12).

Subsequently, sequencer 40 carries out the performance starting checking routine shown in FIG. 4 (step S13). The performance starting checking operation at step S13 is illustrated in detail in FIG. 4. Referring to FIG. 4, sequencer 40 determines whether the local gaming machine unit is set in the master mode (step S131). Sequencer 40 sets the LABEL #1 as the readout start position (step S136 in FIG. 4). The LABEL #1 is located at the head of performance data train 82 (i.e., the head of the sound track) stored in performance data memory 80 as indicated in FIG. 5, in accordance with the commands stored in common memory 30 by main CPU 20. Then, sequencer 40 returns to step S13 in FIG. 3.

After step S13, sequencer 40 carries out a sound track performance operation (step S14). Sequencer 40 reads the performance data from the position indicated by the LABEL #1 in FIG. 5 to perform the sound track performance operation. As can be seen from the above, sequencer 40 in this embodiment serves as a memory control means.

At step S15, sequencer 40 determines whether the local gaming machine unit is set in the master mode. Sequencer 40 increments the counter at step S16. Subsequent to this operation, CPU 210 in sequencer 40 supplies the counter value of the counter to the slave gaming machine units through communication modules 10. This counter value is written in counters 31 in common memories 30 in the slave gaming machine units as described in more detail below. In this embodiment, the sequencer setting the gaming machine unit as the master for the sound track performance operation corresponds to the synchronization data setting unit. More specifically, CPU 210 is the synchronization data setting unit. Sequencer 40 determines, after step S16, whether the sound track performance operation is complete (step S17). If step S17 indicates that the performance of the sound track is not complete, then sequencer 40 returns to step S14 to repeat the subsequent steps. On the other hand, if step S17 in FIG. 3 indicates that the performance of the sound track is complete, then sequencer 40 leaves this routine. The above-mentioned procedures are the sound track performance operation in the master gaming machine unit. The master gaming machine unit plays a sound track or tracks as BGM at a simultaneous time or after a short elapse of time after the gaming machine unit is set as the master.

The sound track performance operation is described next with reference to FIGS. 3 through 5 where the gaming machine unit is set in the slave mode in the master-slave allocation routine of FIG. 2. When the gaming machine unit is set in the slave mode in the master-slave allocation routine in FIG. 2 and the sound track performance routine in FIG. 3 is initiated, sequencer 40 determines at step S11 whether the local gaming machine unit is in the master mode. Sequencer 40 then carries out at step S13 the performance starting checking routine shown in FIG. 4. Sequencer 40 determines at step S131 whether the local gaming machine unit is set to the master mode. Sequencer 40 then checks the value of counter 31 in common memory 30 (step S132). The sequencer determines whether the value read out of counter 31 in common memory 30 is predetermined as a counter value in correspondence table 81 (step S133). Referring to FIG. 5, sequencer 40 compares the counter value read out of counter 31 in common memory 30 with the counter value in correspondence table 81 read out of performance data memory 80.

When step S133 indicates that sequencer 40 determines the counter value is not in correspondence table 81, sequencer 40 returns to step S132. In other words, when the counter value read out of counter 31 is different from the counter value predetermined in correspondence table 81, sequencer 40 is left on standby without playing a sound track until the counter value read out of counter 31 coincides with any one of counter values 51, 105, 159, etc., in correspondence table 81.

On the other hand, if step S133 in FIG. 4 indicates that the counter value is in correspondence table 81, then sequencer 40 selects the position where the performance begins (step S134) and carries out the performance starting operation (step S135). Referring to FIG. 5, if it is determined that the counter value read out of counter 31 is the 105th frame, then sequencer 40 reads the performance data 3 from the beginning of performance data train 82, with the LABEL #3 indicative of the position where the performance is initiated for counter value 105.

After completion of the performance starting checking sub-routine shown in FIG. 4, sequencer 40 returns to step S14 in FIG. 3. Sequencer 40 carries out the sound track performance operation at step S14. Accordingly, the gaming machine units in this embodiment begin performing the sound track(s) as BGM from the head of performance data train 3 corresponding to the head of the second measure, for example, 1.8 seconds after the beginning of the performance by the gaming machine unit in the master mode.

Sequencer 40 determines at step S15 in FIG. 3 whether the local gaming machine unit is set to the master mode. Sequencer 40 goes to step S17 to determine whether the sound track performance operation is complete. If step S17 indicates that the performance of the sound track is not complete, then sequencer 40 returns to step S14 to repeat the subsequent steps. On the other hand, if step S17 in FIG. 3 indicates that the performance of the sound track is complete, then sequencer 40 leaves the sound track performance routine in FIG. 3. The above-mentioned procedures are the control for the sound track performance operation in the slave gaming machine units. The slave gaming machine units do not increment the counter by sequencer 40. Instead, the slave gaming machine units refer to the counter value in CPU 210 in sequencer 40 of the master gaming machine unit via communication modules 10. In this way, the slave gaming machine units can change the start position of the performance data by an amount corresponding to the half measure to synchronize the sound tracks performed as the BGM among the printed circuit boards mounted in all the associated gaming machine units.

With this embodiment of the invention, it is possible to provide a clearer sound field by the whole game communication system, thereby giving the players a better perspective from a productive viewpoint.

In the first embodiment, the master and slave modes in the sound track performance routine described in conjunction with FIGS. 3 and 4 are assumed to be the same as the master and slaves, respectively, of the communication operation. However, the invention is not limited to the above-described configuration. The master or slave mode in the sound track performance routine described in FIGS. 3 and 4 indicate the master or slave for the sound track performance. When any communication protocol other than that used in this embodiment is employed, the master gaming machine unit for the communication operation may serve as the slave gaming machine unit for the sound track performance operation. Likewise, the slave gaming machine unit for the communication operation may serve as the master gaming machine unit for the sound track performance operation.

The performance unit in the above-mentioned embodiment utilizes a look-up table approach with main CPU 20 adapted to separate performance data train 82 forming the sound track into a plurality of segments each having a predetermined data length, label the segments, store them in performance data memory 80 and allocate the master mode or the slave mode for the performance operation to the gaming machine units; ROM 220 storing correspondence table 81 having the counter value used to determine the timing when main CPU 20 starts performance by the slave gaming machine units and the labels carried on sound data train 82; CPU 210 forming sequencer 40 for use in selecting the label indicative of the position where the performance started, according to the counter value obtained and based on the track status of the sound track performed by the master gaming machine unit and to the counter value defined in correspondence table 81 read out of ROM 220; and label selecting unit. However, the invention is not limited to the above-mentioned configuration. The performance unit may have any configuration that can provide synchronous performance of the sound tracks by all of the associated gaming machine units. For example, the performance unit may be capable of performing sound tracks from the performance data at the position corresponding to information indicative of the performance start position determined from a signal that serves as a timing signal for the performance by the gaming machine units, without using the look-up table.

Figure 14:
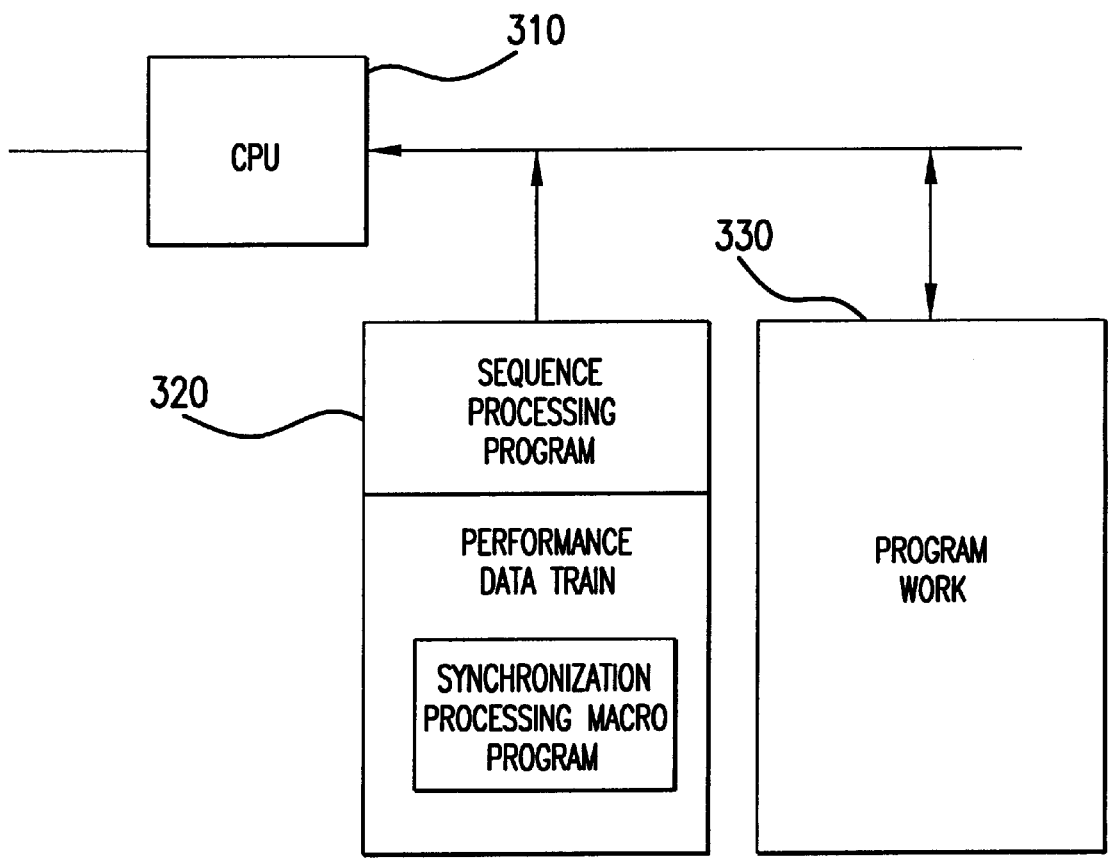
FIG. 14 depicts a block diagram illustrating peripheries of a sequencer according to a first modification of the first embodiment of the invention.

The first embodiment may also be modified as follows. In the first modification, the game communication system synchronizes sound tracks in response to a command in performance data memory 80, which is described with reference to FIGS. 14 and 15. FIG. 14 depicts a block diagram illustrating peripheries of a sequencer according to the first modification of the first embodiment of the invention. FIG. 15 is a schematic representation of a sequencer program carried out in the first modification.

Performance data memory 80 is stored as read only memory (ROM) 320 which contains a sequence processing program and performance data train 82, as shown in FIG. 14. As shown in FIG. 15, the sequence processing program is described from the head address of ROM 320 corresponding to performance data memory 80. For performance data train 82, note data are described in a predetermined region in ROM 320 (FIG. 14) corresponding to performance data memory 80, following the sequence processing program. The performance starting checking routine is described in the note data, as can be seen in FIG. 15, to check correspondence table 81 and the values therein.

Figure 16:
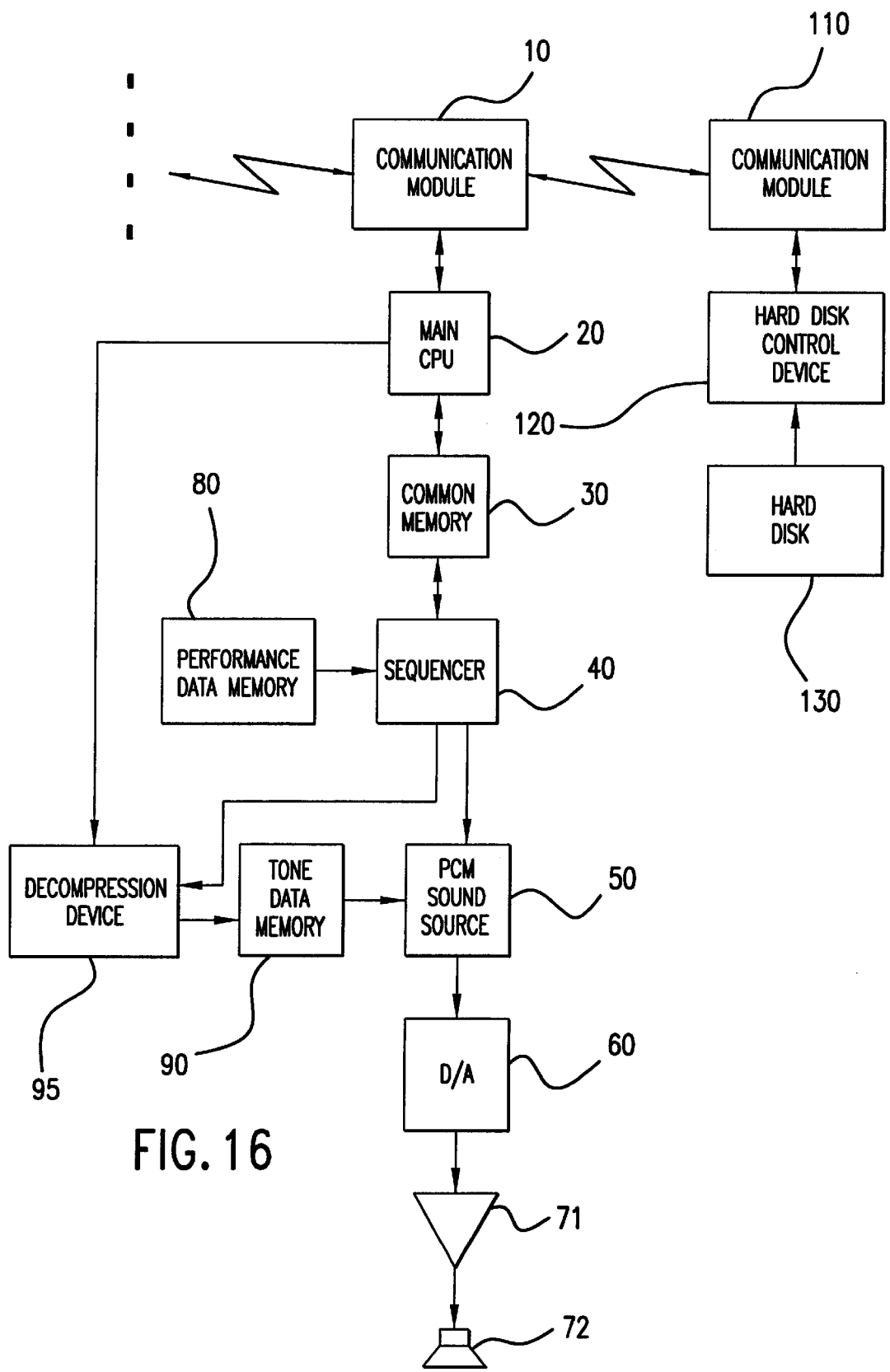
FIG. 16 depicts a block diagram illustrating essential configurations of a game communication system according to a second modification of the first embodiment of the invention.
Figure 17:
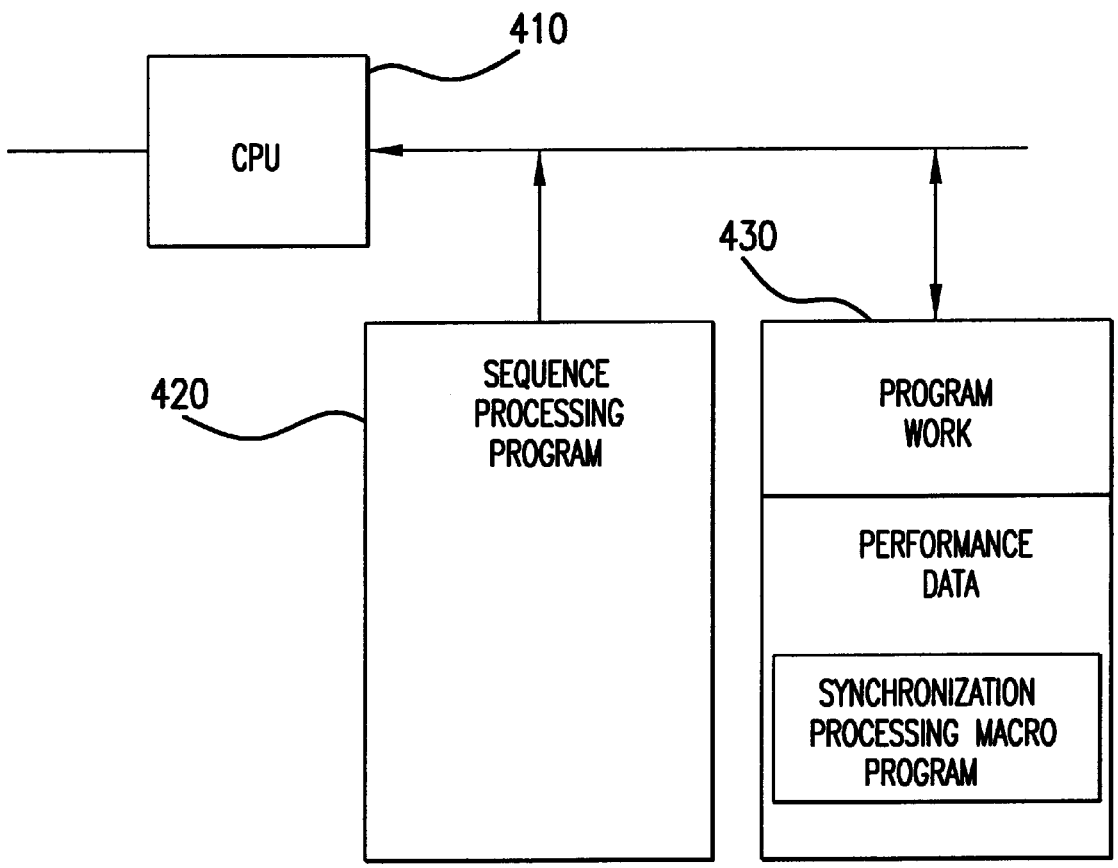
FIG. 17 depicts a block diagram illustrating peripheries of the sequencer according to the second modification.

The first embodiment may also be modified in a second modification so that the game communication system is adapted to download tone data and/or note data by means of main CPU 20. This is described with reference to FIGS. 15 through 18. FIG. 16 depicts a block diagram illustrating essential configurations of the game communication system according to the second modification of the first embodiment of the invention. FIG. 17 is a block diagram illustrating the peripheries of the sequencer according to the second modification. FIG. 18 is a schematic representation of a data structure of compressed tone data according to the second modification.

The game communication system according to this modification is similar in structure to the one described with reference to FIG. 1 except for the following. A decompression device 95 is added to each gaming machine unit. A hard disk control device 120 and a hard disk 130 are connected to the communication module through a local area network (LAN) to form a downloading unit for use in reproducing stream data. Similar components and parts to those described in conjunction with the above embodiment are depicted by like reference numerals and, thus, detailed description thereof is omitted.

Main CPU 20 supplies a command to hard disk control device 120 through communication modules 10 and 110 to request the transfer of necessary tone data. Main CPU 20 has additional functions for receiving a compressed tone data through communication modules 10 and 110 and supplying it to decompression device 95.

Sequencer 40 includes a CPU 410 and, as described above, supplies a performance data train to PCM sound source 50 to carry out the sound track performance operation while achieving synchronization according to the routine of the flow charts shown in FIGS. 3 and 4. Sequencer 40 uses, as shown in FIG. 17, a ROM 420 to store the sequence processing program and a RAM 430 as a program working area.

Performance data memory 80 is stored as RAM 430 and stores performance to data train 82 (FIG. 17). Performance data train 82 includes the note data described after the program working area in RAM 430 and which corresponds to the performance data memory 80, as shown in FIG. 15. The performance starting checking routine to check correspondence table 81 and the values therein is realized by means of being described in the note data as shown in FIG. 15.

Decompression device 95 decompresses the tone data that has been compressed according to the MPEG Audio compression algorithm of a fixed length or any other compression algorithm of a variable length. Decompression device 95 maps the decompressed data onto tone data memory 90. FIG. 18 shows examples of data structure of the compressed tone data that can be processed by decompression device 95. The first example is a structure using one block for one data with a variable block length (FIG. 18(*a*)). The second example is a structure in which one data corresponds to two or more blocks with a fixed block length (FIG. 18(*b*)). The third example is a structure in which one data corresponds to three blocks with a variable block length (FIG. 18(*c*)). FIG. 18(*d*) shows a structure of the block having a header and compressed data. The header indicates, for the block of a variable length, an address and a data compression rate which are used for mapping onto the tone data memory. On the other hand, for the block of a fixed length, the header indicates, for example, a bit rate index if the compression is made based on the MPEG Audio compression algorithm.

Communication module 110 is used as a LAN connection of hard disk 130 with the individual gaming machine units. Hard disk control device 120 controls hard disk 130, which stores the note data and tone data.

The second modification provides much louder tones to give better impressions to a player because in addition to reading out the tone data previously stored in tone data memory 90 and the performance data stored in performance data memory 80, the tone data and note data from hard disk 130 are also read out as stream data through the LAN. Moreover, it is also possible to reproduce long tone data that cannot be stored in tone data memory 90 or performance data memory 80.

Second Embodiment of the Invention

Figure 8:
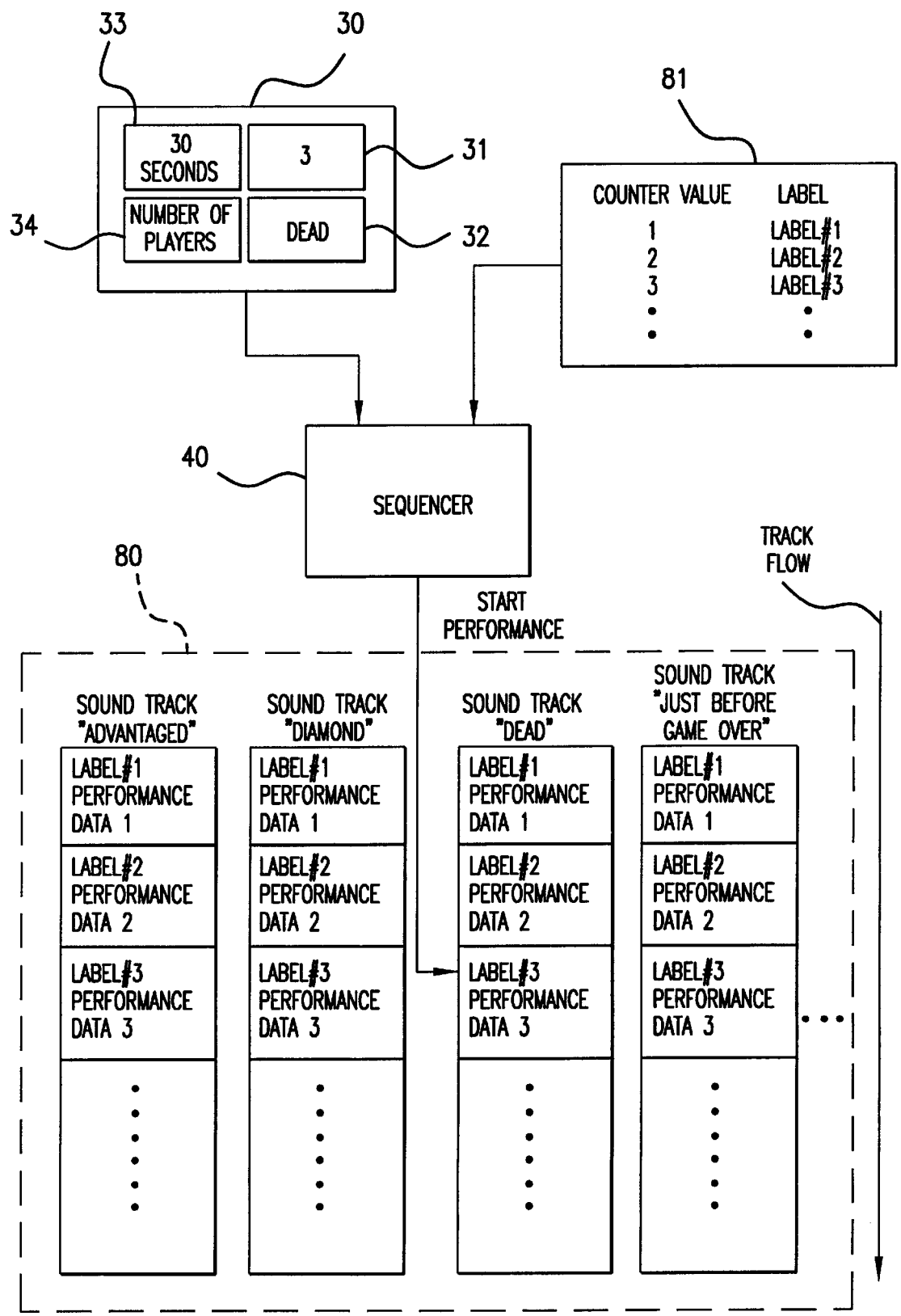
FIG. 8 depicts a data flow diagram illustrating a performance status in a gaming machine unit according to a second embodiment of the invention.

FIG. 8 depicts a data flow diagram illustrating a performance status in a gaming machine unit according to a second embodiment of the invention. FIG. 9 is a schematic representation of a sequencer program used in the second embodiment of the invention.

The game communication system according to this embodiment includes similar configurations to those described in the first embodiment. Therefore, similar components and parts are depicted by like reference numerals and a detailed description thereof is omitted. Thus the following description focuses on differences from the first embodiment.

Common memory 30 is a memory commonly used for main CPU 20 and sequencer 40 as described in the first embodiment. As shown in FIG. 8, common memory 30 includes registers 31 through 34. Register 31 holds a counter value obtained in the master gaming machine unit. Register 32 holds the data indicative of a status of a game. Register 33 holds a value indicative of a remaining time of the game. Register 34 holds a value indicative of the number of players on a team containing the player associated with the master gaming machine unit.

When the gaming machine unit is in the slave mode, the value in Register 31 is set by main CPU 20 in the master gaming machine unit. When the gaming machine unit is in the master mode, the local main CPU 20 sets the values in registers 31 through 34.

Sequencer 40 includes a CPU (not shown) and a RAM (not shown) which serves as a program working area. Sequencer 40 supplies performance data train 82 to PCM sound source 50 to carry out the performance operation while carrying out the operations shown in the flow charts in FIGS. 10 through 13. The CPU (not shown) which forms sequencer 40 includes a timer capable of counting each single frame and carries out the counting operation only when the local gaming machine unit is set to the master mode. Similarly to the first embodiment, the single frame used herein refers to the smallest segment of time that can be processed by the hardware of the type described in this embodiment and is, for example, approximately equal to ¹⁄₆₀ of a second.

Performance data memory 80 is stored as a ROM and includes the sequence processing program and performance data train 82 (FIG. 9). The sequence processing program shown in FIGS. 10 through 13 is achieved by means of describing it in a predetermined region as shown in FIG. 9. Performance data memory 80 stores the programs for use in controlling the PCM sound source and a volume adjustment table (FIG. 9).

In the game communication system, a sound track associated with a certain status of the game may be unnecessarily loud when a plurality of gaming machine units perform the sound tracks associated with the same status as BGM of the game. In order to solve such a problem, the game communication system according to the second embodiment includes the volume adjustment table for adjusting the volume of the sound tracks associated with the same status of the game and which is performed by the two or more gaming machine units in such a manner that the sound tracks have the same level to the players' ears.

The volume adjustment table is adapted to adjust the volume of the sounds to the players' ears depending on the number of members included on the team to which the players belong. For example, the volume adjustment table is set in such a manner that the volume is 70% the normal volume when four players participate in the game, 80% for three players and 90% for two players. The normal volume is defined as the maximum volume heard by the ears for a single player, and is adjusted depending on the environment where the game communication system is installed.

The volume adjustment table defines the normal volume for the sound tracks performed as the BGM during events such as "dead" or "found a diamond".

Performance data train 82 is stored in performance data memory 80 in the form of, for example, note data obtained from musical notes and data for controlling the PCM sound source (FIG. 8). Performance data train 82 is separated for each sound track such as "advantaged", "diamond", "dead" and "just before the game is over". Accordingly, the sound tracks can be selected and read out depending on the event during the game.

Performance data train 82 is note data which can be advantageously used to control the total track time of separating the performance data train by the labels. For example, performance data train 82, of the above-mentioned sound track, is separated into performance data 1, performance data 2, performance data 3 and performance data 4 for every data amount corresponding to 0.9 seconds, i.e., the half measure. Labels are inserted into the heads of each of the four performance data. The labels are: LABEL #1, LABEL #2, LABEL #3 and LABEL #4. Reading the performance data at the position indicated by the LABEL #N results in starting a sound track from any one of the half measure positions. Even if the volume is changed at this time, it is still comfortable to listen to.

In this embodiment, performance data train 82 is separated by every half measure. In this regard, a user is not kept waiting for a time duration longer than 1 second. The full measure of the sound track employed as the BGM herein is equal to, for example, 1.8 seconds and, thus, the half measure meets the above requirement. It is noted that the invention is not limited to the embodiment with performance data train 82 separated by every half measure, as long as the time duration will not cause people to be kept waiting. For example, the time duration may be one third measure for a triple time sound track (in other words, a piece of music with a rhythm of three beats in each measure).

Figure 10:
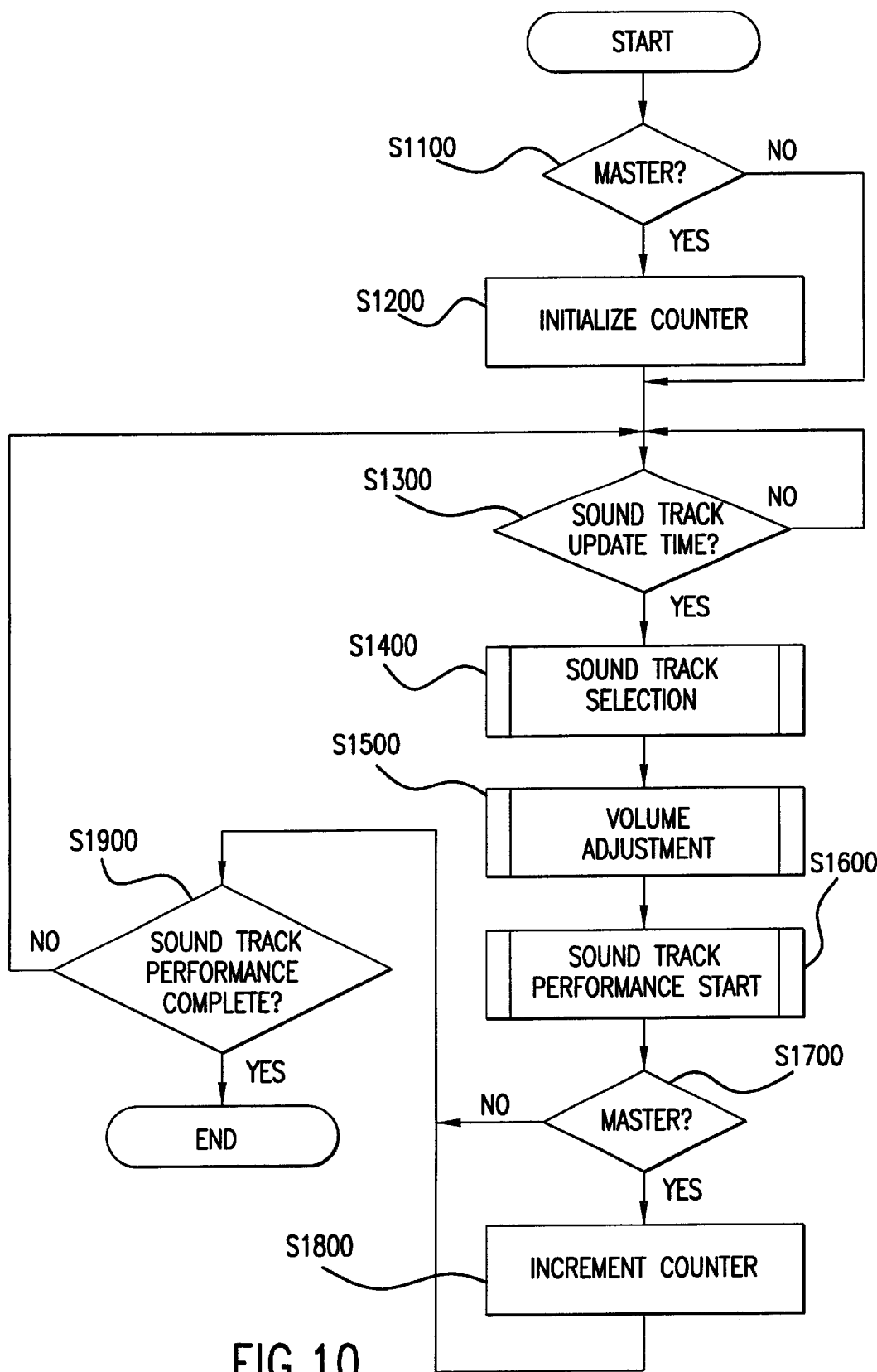
FIG. 10 depicts a flow chart illustrating a sound track performance routine carried out in the second embodiment of the invention.
Figure 11:
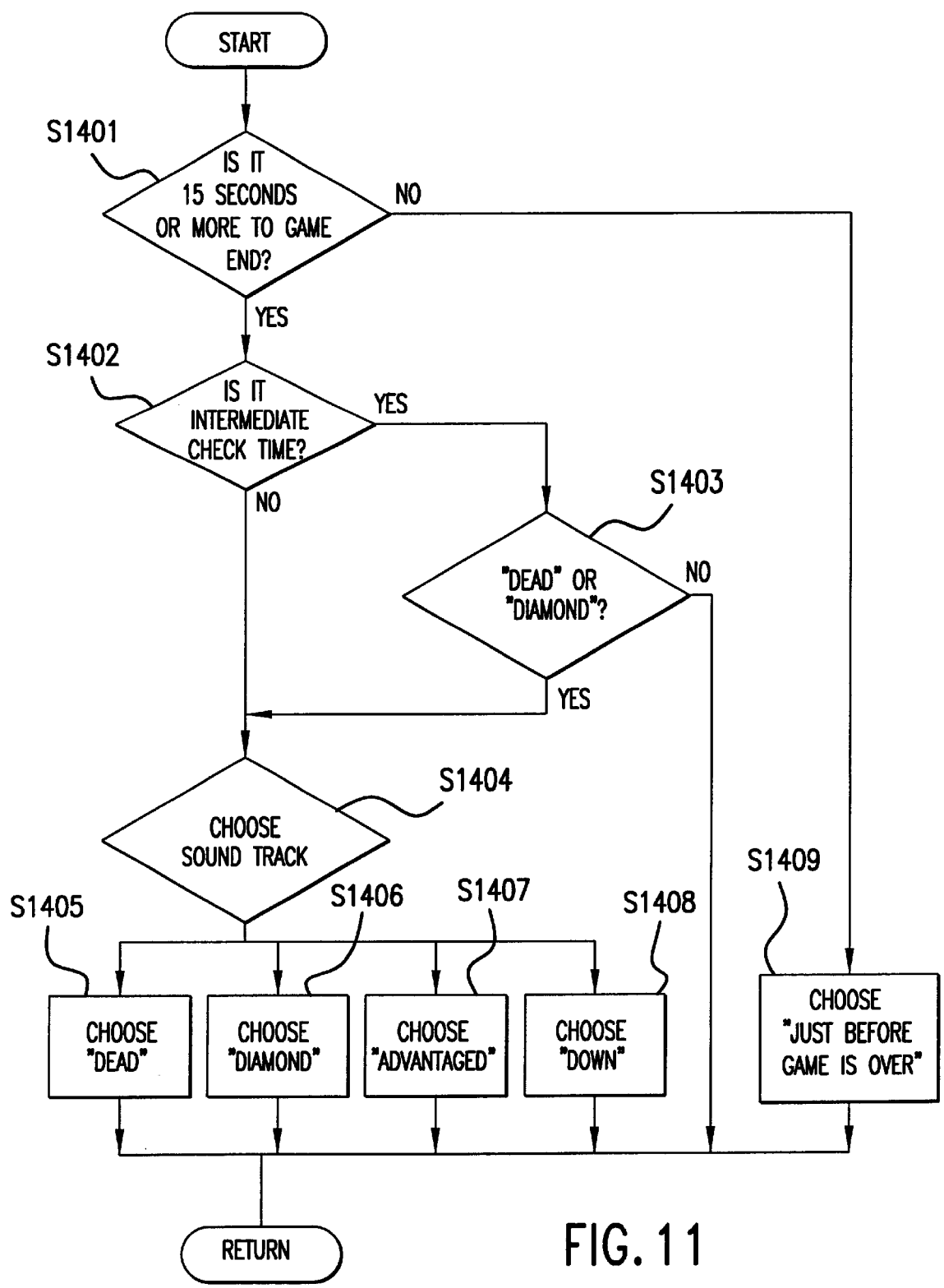
FIG. 11 depicts a flow chart illustrating a sound track selecting sub-routine carried out in the second embodiment of the invention.
Figure 12:
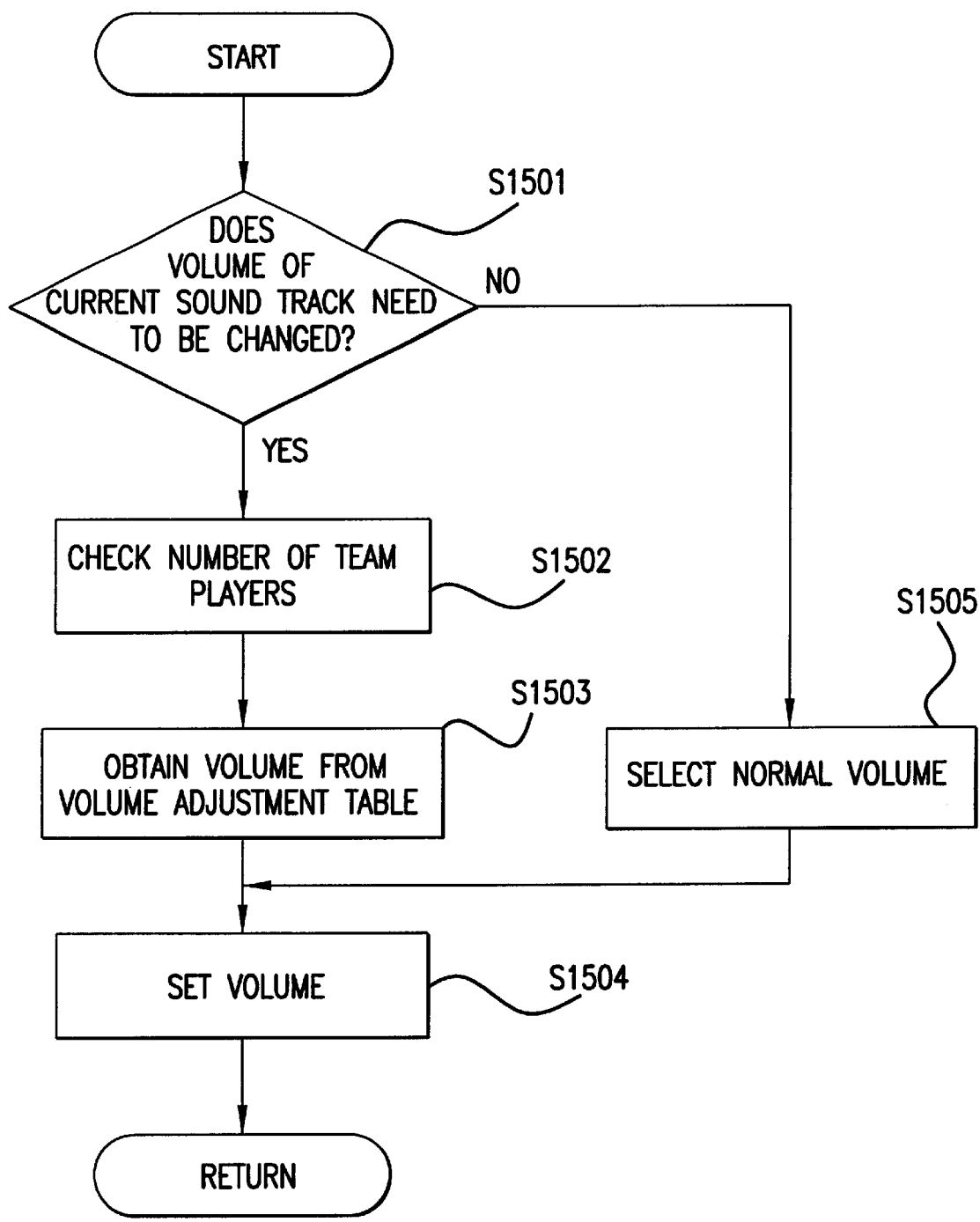
FIG. 12 depicts a flow chart illustrating a volume adjusting sub-routine carried out in the second embodiment of the invention.
Figure 13:
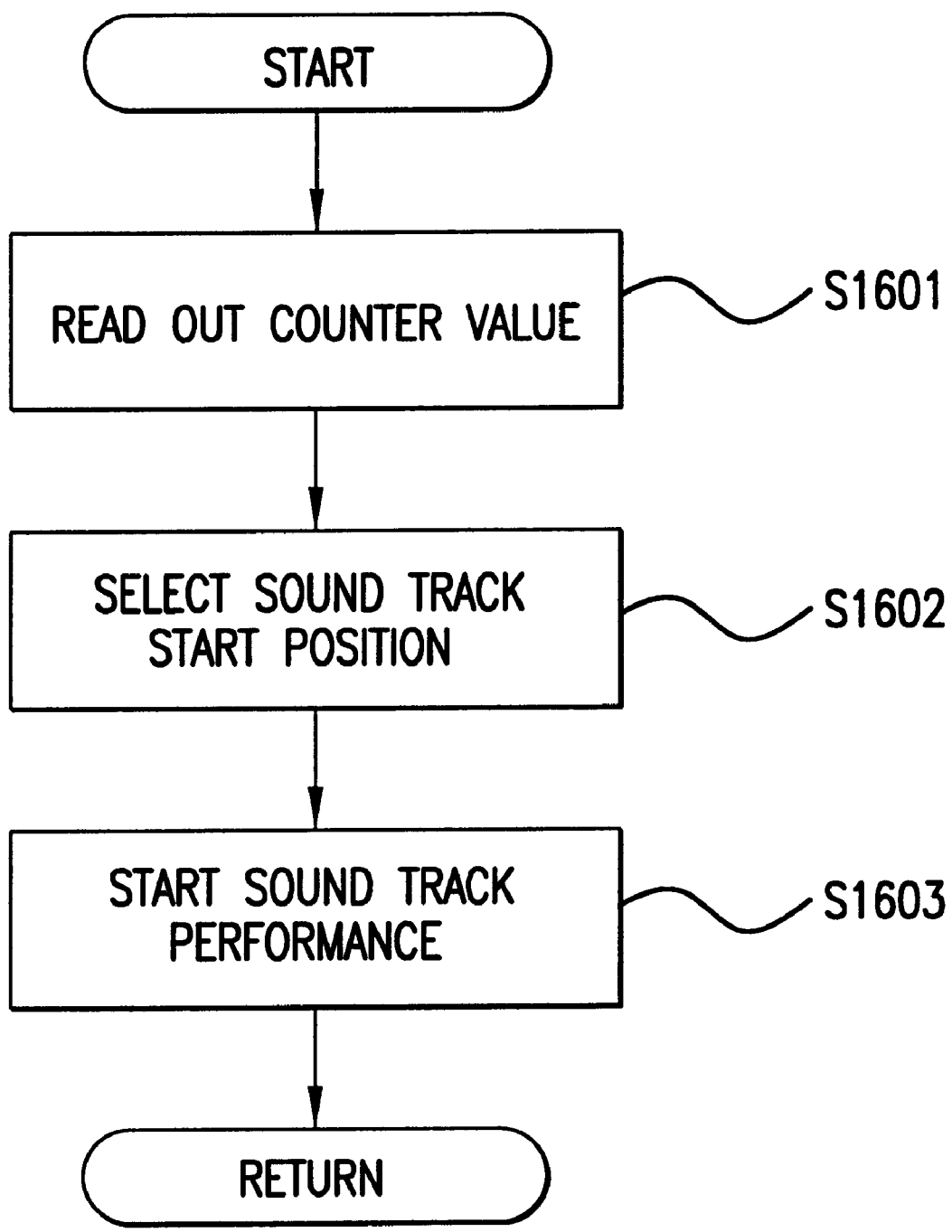
FIG. 13 depicts a flow chart illustrating a sound track performance starting sub-routine carried out in the second embodiment of the invention.

FIG. 10 depicts a flow chart illustrating a sound track performance routine carried out in the second embodiment of the invention. FIG. 11 depicts a flow chart illustrating a sound track selecting sub-routine carried out in the second embodiment of the invention. FIG. 12 depicts a flow chart illustrating a volume adjusting sub-routine carried out in the second embodiment of the invention. FIG. 13 depicts a flow chart illustrating a sound track performance starting sub-routine carried out in the second embodiment of the invention.

The sound track performance operation is described with reference to FIGS. 10 and 13 where the gaming machine unit is set in the master mode. When the gaming machine unit is set in the master mode for the master-slave allocation routine (as described in FIG. 2), and the sound track performance routine in (FIG. 10) is initiated, sequencer 40 determines at step S1100 whether the local gaming machine unit is located in the master mode and initializes the counter value to zero (step S1200). Sequencer 40 refers to a built-in timer to determine whether it is time to update the sound track (step S1300).

When step S1300 determines that the sound track should be updated, sequencer 40 carries out the sound track selecting sub-routine (step S1400). The sound track selecting sub-routine shown in FIG. 10 is described specifically with reference to FIGS. 8 and 11. When the sound track selecting sub-routine begins, sequencer 40 determines whether it is just before the game is over (i.e., whether it is 15 seconds or more to the end of the game in step S1401).

If it is determined in step S1401 that the game is not just about to end (i.e., it is 15 seconds or more to the end of the game), then sequencer 40 refers to the value of the built-in timer to determine whether it is an intermediate timing check (step S1402). If it is determined in step S1402 it is the intermediate timing check, then sequencer 40 refers to the content of register 32 in common memory 30 which is indicative of the status of the game. Thus, sequencer 40 determines whether the current sound track is either the "dead" or "diamond" track (step S1403). If it is determined in step S1403 that the content of register 32 corresponds to either the "dead" or "diamond" track, then sequencer 40 selects the corresponding sound track of the "dead" or "diamond" track out of performance data memory 80, as shown in FIG. 8 (steps S1404, S1405 and S1406). In other words, if the status is either "dead" or "diamond", then sequencer 40 changes the sound track performed as BGM by every 54 frames corresponding to the intermediate timing check.

Upon completion of the sub-routine, sequencer 40 proceeds to the operation at step S1500 in FIG. 10. In the series of operations carried out by steps S1402 through S1406, the sound tracks are selected at a shorter time interval in the "dead" or "diamond" status than in the normal game status for the following reason. When the "dead" event interrupts the subsequent game play, the player is to be informed of the event as soon as possible. Interruption by he "diamond" event, on the other hand, occurs for a short period in the game play, and the player is immediately informed of the event the sound track. On the other hand, even if step S1402 determines that it is the intermediate timing check, sequencer 40 will not carry out the sound track selection when it determines (step S1403) that the current sound track is neither the "dead" nor "diamond" track. Sequencer 40 then completes the sub-routine, shown in FIG. 11, and goes to step S1500. Events other than these are not required to be informed to the players. While the embodiment has thus been described in conjunction with the case where the event used to change the sound track at the intermediate timing is either the "dead" or "diamond" track, the invention is not limited thereto. The event may be any one of the events that should be informed to the players immediately.

Sequencer 40 carries out the operation to select "just before the game is over" if it is determined in step S1401 that it is just before the game is over (i.e., the remaining time is shorter than 15 seconds) (step S1409). Sequencer 40 then completes this sub-routine and proceeds to the operation at step S1500 in FIG. 10. If it is determined in step S1402 that it is not the intermediate timing check, i.e., it is 108 frames and corresponding to the full measure, then sequencer 40 refers to the content of register 32 in common memory 30 to carry out the operation to select the corresponding sound track (step S1404). More specifically, sequencer 40 carries out any one of the steps to select "dead" (step S1405), "diamond" (step S1406), "advanced" (step S1407) or "down" (step S1408) after the sound track selection at step S1404, depending on the content of register 32. This allows change of the sound track to be performed as BGM at the normal sound track update time, that is, by every 108 frames.

The sound tracks used in the embodiment are the same in rhythm and tone. The sound tracks are collectively used as a single piece of music for the entire game communication system even when the sound tracks are changed depending on the game status as described below.

The gaming machine units in the embodiment are directed to improve productive effects by informing the player of his or her game status from the change of the sound tracks performed as the BGM. For example, the sound tracks for the "top" player are expressed by a tone with a large number of treble tones and those for the "last" player are expressed as tones with a small number of bass tones. Sound tracks such as "the team is advancing" and "the team is down" are expressed as tones falling in between the "top" player and "last" player.

Subsequent to either one of the above-mentioned steps S1405 through S1408, sequencer 40 completes the sub-routine shown in FIG. 11, and then completes the sub-routine at step S1400 in FIG. 10. Thereafter, sequencer 40 carries out the volume adjusting sub-routine (step S1500).

The volume adjusting sub-routine carried out at step S1500 is described with reference to FIGS. 8 and 12. Sequencer 40 carries out the volume adjusting sub-routine in FIG. 12 to determine whether the volume should be changed (step S1501). If it is determined instep S1501 that the volume adjustment is not required for the current sound track (e.g., the current sound track is the one selected when the game status is "top" or "last"), sequencer 40 chooses the normal volume (step S1505). Sequencer 40 adjusts the volume (step S1504) to complete this sub-routine and then carries out step S1600. The volume adjustment table in this embodiment is not activated at the player's gaming machine unit if he or she is the top or last player. The sound tracks for the top and last players are always performed at a single gaming machine unit at the maximum volume independent of the number of players on the team.

If it is determined in step S1501 that the volume adjustment is required for the current sound track (e.g., the current sound track is the one selected when the game status is not "top" or "last"), then sequencer 40 refers to the value of register 34 in common memory 30 to check the number of players on the team (step S1502). Sequencer 40 obtains the volume data from the above-mentioned volume adjustment table according to the value of register 34 (step S1503). Sequencer 40 sets the volume (step S1504) and completes the sub-routine shown in FIG. 12. Subsequently, sequencer 40 carries out the sound track performance starting sub-routine in FIG. 10 (step S1600). As described above, according to the volume adjusting sub-routine in FIG. 12, the sound track(s) associated with a certain game status will not become unnecessarily loud.

The sound track performance starting sub-routine at step S1600 is described with reference to FIG. 13. When the sound track performance sub-routine in FIG. 13 is carried out, sequencer 40 reads out the counter value from the built-in timer (step S1601). The sequencer selects the start position where the performance of the sound track starts, according to the counter value obtained at step S1601 (step S1602). Sequencer 40 starts to carry out the sound track performance operation (step S1603) and completes the sub-routine shown in FIG. 13. Sequencer 40 then carries out step S1700 in FIG. 10.

Sequencer 40 determines at step S1700 whether the local gaming machine unit is in the master mode and increments the built-in counter (step S1800). Subsequent to this operation, main CPU 20 supplies the counter value of the counter to the slave gaming machine units through communication modules 10. This counter value is written in counters 31, located in common memories 30 in the slave gaming machine units.

After step S1800 in FIG. 10, sequencer 40 determines whether the sound track performance operation is complete (step S1900). If it is determined in step S1900 that the performance of the sound track is not complete, then sequencer 40 returns to step S1300 to repeat the subsequent steps. On the other hand, if it is determined in step S1900 in FIG. 10 that the performance of the sound track is complete, then sequencer 40 leaves the main routine in FIG. 10. The above-mentioned procedures are the sound track performance operation in the master gaming machine unit. It is possible to enhance the sound effects on the players by changing, at appropriate times, the sound tracks performed as the BGM.

The flowchart in FIG. 10 does not include the sound track performance operation. The sound track performance operation is similar to that described in conjunction with the first embodiment. The sound track performance operation is carried out in parallel with the sound track selection or the volume adjustment in response to the beginning of the sound track performance starting operation. The sound track performance operation is described with reference to FIGS. 10 through 13 where the gaming machine unit is set to the slave mode. When the gaming machine unit is set to the slave mode in the master-slave allocation routine (FIG. 2) and the sound track performance routine (FIG. 10) is initiated, sequencer 40 determines at step S1100 whether the local gaming machine unit is in the master mode. Sequencer 40 then refers to register 32, in common memory 30, at step S1300 to determine whether the current sound track should be updated. Sequencer 40 in the slave gaming machine unit carries out the operations shown in FIGS. 8 and 10 through 13.

Each slave gaming machine unit, according to this embodiment, refers to register 32 in common memory 30 to select the sound track suitable for the game status. The selected sound track is performed from the labeled position corresponding to the counter value counted by sequencer 40 forming the master gaming machine unit. Accordingly, the sound track is performed in synchronism with those performed by other master and slave gaming machine units without any time delay.

Sequencer 40 determines at step S1100 in FIG. 10 whether the local gaming machine unit is in the master mode and carries out steps S1300 through S1600. Sequencer 40 determines at step S1700 whether the local gaming machine unit is in the master mode and determines whether the performance of the current sound track is complete (step S1900). If it is determined in step S1900 that the performance of the current sound track is not complete, then sequencer 40 returns to step S1300 to repeat the subsequent steps. On the other hand, if it is determined in step S1900 that the performance of the sound track is complete, then sequencer 40 exits the main routine.

The above-mentioned procedures are the sound track performance operation in the slave gaming machine unit. The slave gaming machine unit refers to register 32 in common memory 30 to select the sound track suitable for the game status and performs that sound track from the labeled position corresponding to the counter value counted by sequencer 40 forming the master gaming machine unit. Accordingly, the slave gaming machine unit is capable of changing the start position for the performance data by, for example, half measure or by one third measure. The sound track is performed in synchronism with those performed by the other master and slave gaming machine units without any time delay.

While the above-mentioned embodiment has been described where only the main CPU 20 in the master gaming machine unit counts down the time to the end of the game, the invention is not limited to such configuration. Similar effects can equally be obtained when, for example, main CPU 20 in the slave gaming machine unit receives a start timing of an attraction mode or a game and counts down the time to the end of the game.

As explained above, the game communication system according to this embodiment can change the sound tracks performed as BGM depending on the game status in each gaming machine unit. As a result, this creates better sound effects for the players from a productive viewpoint. Furthermore, the sound tracks can be used collectively as a single piece of music for the entire game communication system.

Figure 18A:
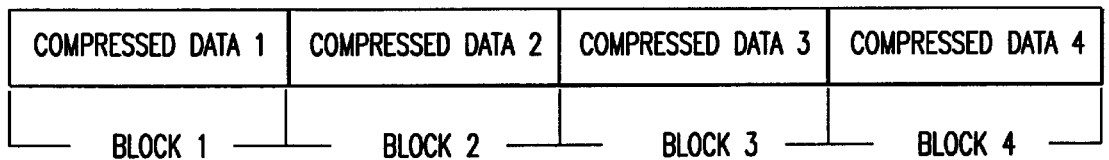
FIG. 18 is a schematic representation of a data structure of compressed tone data according to the second modification.
Figure 18B:
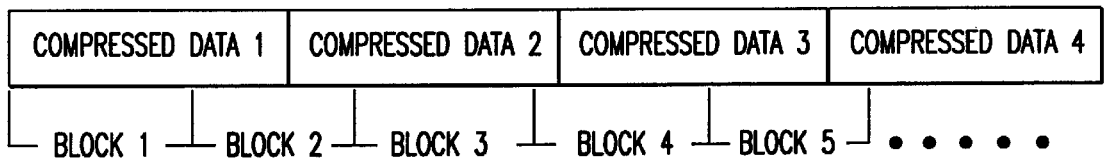
Figure 18C:
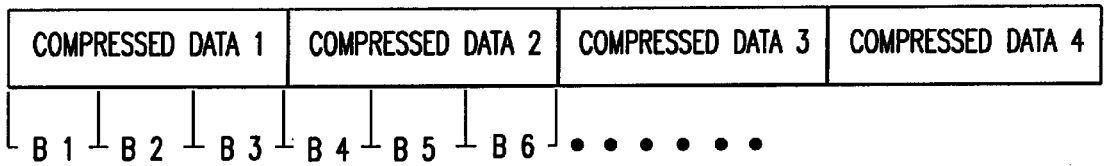
Figure 18D:
Figure 19:
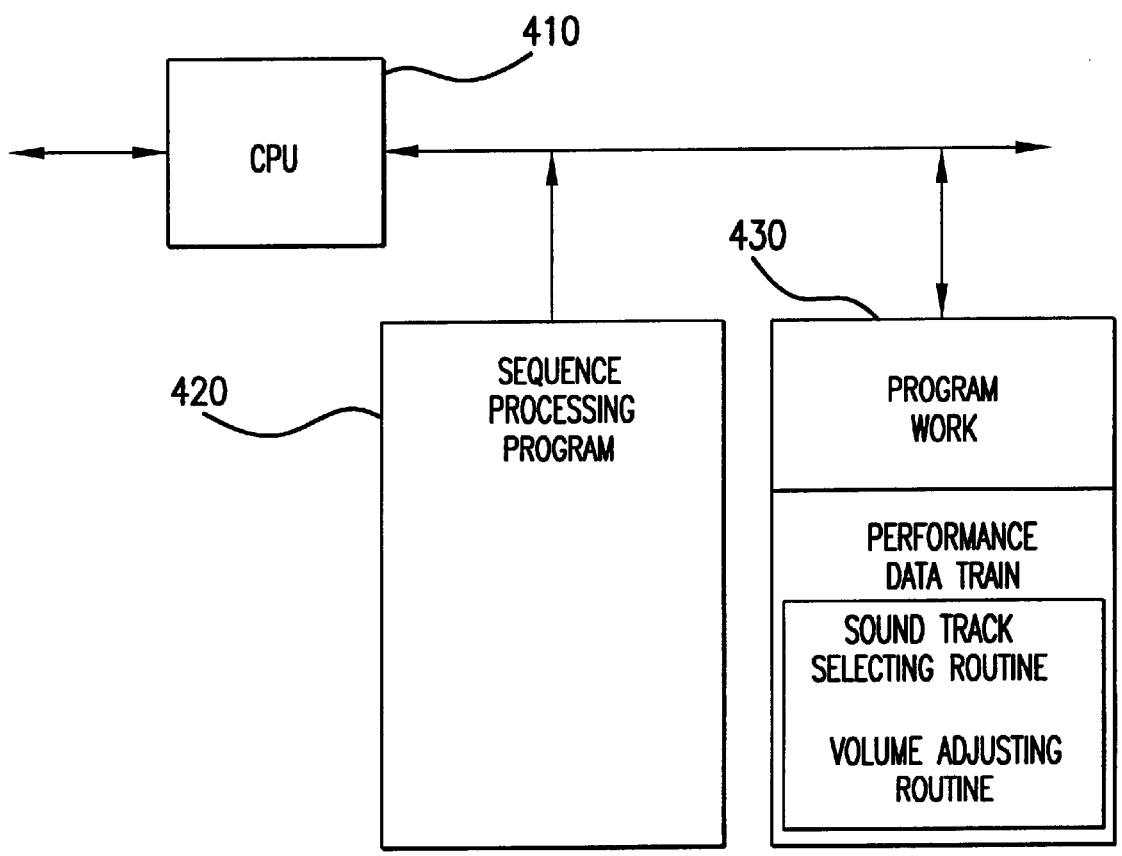
FIG. 19 depicts a block diagram illustrating a schematic configuration of peripheries of the sequencer according to a modification of the second embodiment of the invention.

Next, a modification of the second embodiment is described. The game communication system is adapted to download tone data and/or note data by means of main CPU 20. This modification has a similar configuration to the second modification of the first embodiment. Therefore, FIGS. 16 and 18 are applied correspondingly. In addition to FIGS. 16 and 18, FIG. 19 shows a block diagram illustrating a schematic configuration of peripheries of the sequencer according to a modification of the second embodiment of the invention.

The game communication system according to this modification is similar in structure to the one described with reference to FIG. 16. Decompression device 95 is added to each gaming machine unit. Hard disk control device 120 and hard disk 130 are connected to the communication module through a LAN to form downloading means for use in reproducing stream data. Similar components and parts to those described in conjunction with the above embodiment are depicted by like reference numerals and a detailed description thereof is omitted.

Main CPU 20 supplies a command to hard disk control device 120 through communication modules 10 and 110 to request transfer of a necessary tone data. Main CPU 20 has additional functions for receiving a compressed tone data through communication modules 10 and 110 and supplying it to decompression device 95.

Sequencer 40 includes CPU 410 and supplies a performance data train to PCM sound source 50 to carry out the sound track performance operation while carrying out the operations according to the routine of the flow charts shown in FIGS. 10 through 13. Sequencer 40 uses, as shown in FIG. 19, ROM 420 to store the sequence processing program and RAM 430 as a program working area.

Performance data memory 80 is stored as RAM 430 and stores performance data train 82 (FIG. 19). Performance data train 82 includes the note data described after the program working area in RAM 430 and which corresponds to the performance data memory 80. The performance starting checking routine, which checks correspondence table 81 and the values therein, is realized by the description in the note data.

Decompression device 95 decompresses the tone data. The data may be compressed, for example, according to the MPEG Audio compression algorithm of a fixed length or any other compression algorithm of a variable length. Decompression device 95 maps the decompressed data onto tone data memory 90. FIG. 18 shows examples of data structure of the compressed tone data that can be processed by decompression device 95. The first example is a structure using one block for one data with a variable block length (FIG. 18(a)). The second example is a structure in which one data corresponds to two or more blocks with a fixed block length (FIG. 18(b)). The third example is a structure in which one data corresponds to three blocks with a variable block length (FIG. 18(c)). FIG. 18(d) shows a structure of the block having a header and compressed data. The header indicates, for the block of a variable length, an address and a data compression rate which are used for mapping onto the tone data memory. On the other hand, for the block of a fixed length, the header indicates, for example, a bit rate index if the compression is made based on the MPEG Audio compression algorithm.

Communication module 110 is used as a LAN connection of hard disk 130 with the individual gaming machine units. Hard disk control device 120 controls hard disk 130, which stores the tone data and performance data as the stream data.

This modification provides much louder tones to give better impressions to a player because in addition to reading out the tone data previously stored in tone data memory 90 and the performance data stored in performance data memory 80, the tone data is also read out of hard disk 130 as stream data through the LAN. Moreover, it is also possible to reproduce a long tone data that cannot be stored in tone data memory 90 or performance data memory 80.

Third Embodiment of the Invention

A game communication system according to the third embodiment is directed to enhancing sound effects by dealing with the sound fields formed in respective gaming machine units as a single sound field and controlling the pan therein to provide the sound field with good spatial effects in the entire communication system.

The term "pan" refers to moving an audio signal left or right in the stereo spectrum (speaker channel) in a stereo sound field. It is also called "audio balance". In the third embodiment, the pan achieved in the stereo sound field for each gaming machine unit is referred to as a local pan while the pan achieved in the sound field for the entire game communication system is referred to as a global pan. The game communication system according to the third embodiment controls the local pan which is the audio balance of the speaker channel for each gaming machine unit.

The relationship between the global pan and global pan table in the third embodiment is described with reference to FIGS. 21 through 26. FIGS, 21 through 25 are conceptual views illustrating the global pan of a game communication system according to the third embodiment of the invention. FIG. 26 is a view illustrating an example of a global pan table used in the third embodiment of the invention.

The global pan table illustrated in FIG. 26 is designed for a communication system including four gaming machine units. The global pan table has printed circuit "board number" data and global pan data. The board number data are set to the printed circuit boards mounted in the four gaming machine units. The board number used herein is, for example, a unique number of each board determined in assembling the gaming machine unit. In the third embodiment, the board number is assumed not to change.

In order to achieve the global pan illustrated in FIGS. 21 through 25, the game communication system is required to set the local pan that is determined for each speaker system in the gaming machine unit. The data used for setting the local pan is the predetermined board number data of the individual printed circuit boards as illustrated in FIG. 26. The relationship between the global pan data and the board number data (corresponding to the local pan data) will now be described.

The global pan data is the data used for setting the pan while using the sound fields generated for each stereo channel in the gaming machine units collectively as a single sound field. The global pan data described below is designed for the game communication system including four gaming machine units connected to each other.

Figure 21:
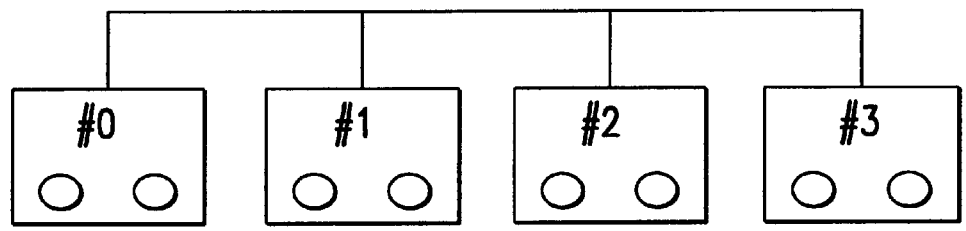
FIG. 21 is a conceptual view illustrating a global pan of a game communication system according to the third embodiment of the invention.

A global pan data LL (FIG. 26) is used to position the pan at the left end of the leftmost gaming machine unit, as indicated by the dotted line in FIG. 21. As shown in FIG. 26, the board number data associated with the global pan data LL indicate LL, OFF, OFF and OFF for the board number 0, board number 1, board number 2 and board number 3, respectively, The board number data LL indicates that the pan is set at the leftmost position of the gaming machine unit having that board number, that is, number 0. The board number data OFF is a data for use in setting the local pan. The OFF indicates that the local pan is not to be produced by preventing any sounds from being generated.

Figure 22:
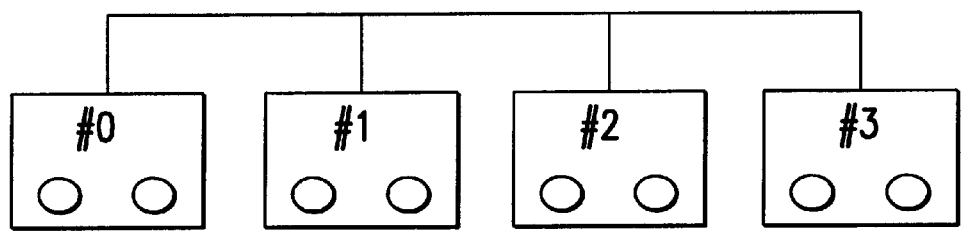
FIG. 22 is another conceptual view illustrating the global pan of a game communication system according to the third embodiment of the invention.

A global pan data L (FIG. 26) is used to position the pan at a position between the leftmost gaming machine unit and its adjacent gaming machine unit, as indicated by the dotted line in FIG. 22. As shown in FIG. 26, the board number data associated with the global pan data L indicate RR, LL, OFF and OFF for the board number 0, board number 1, board number 2 and board number 3, respectively. The board number data LL indicates that the pan is set at the leftmost position of the gaming machine unit having that board number, that is, number 0.

Figure 23:
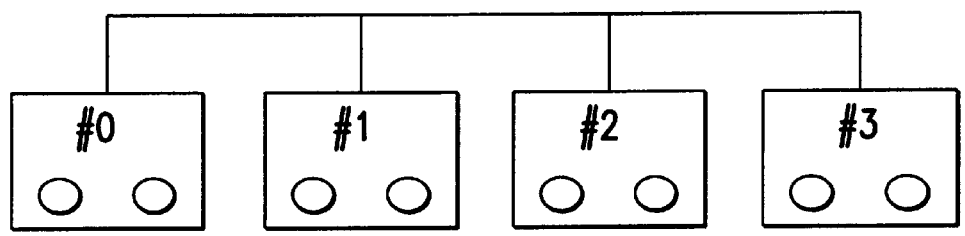
FIG. 23 is another conceptual view illustrating the global pan of a game communication system according to the third embodiment of the invention.

A global pan data C (FIG. 26) is used to position the pan at a position between the inner two adjacent gaming machine units, as indicated by the dotted line in FIG. 23. As shown in FIG. 26, the board number data associated with the global pan data C indicate OFF, RR, LL and OFF for the board number 0, board number 1, board number 2 and board number 3, respectively.

Figure 24:
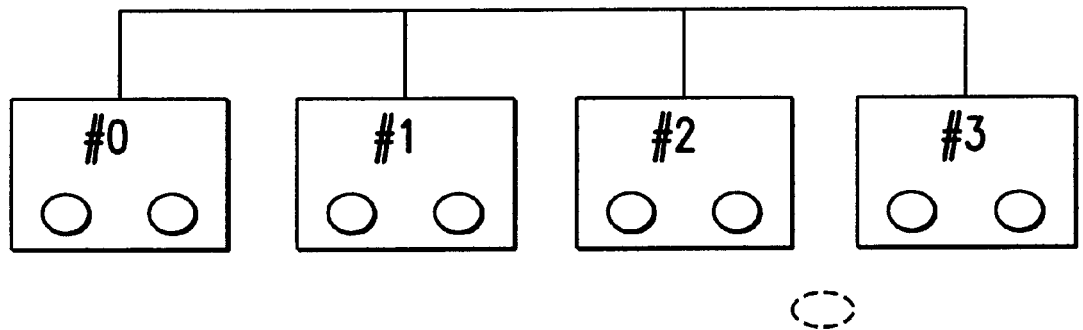
FIG. 24 is another conceptual view illustrating the global pan of a game communication system according to the third embodiment of the invention.

A global pan data R (FIG. 26) is used to position the pan at a position between the rightmost gaming machine unit and its adjacent gaming machine unit, as indicated by the dotted line in FIG. 24. As shown in FIG. 26, the board number data associated with the global pan data R indicate OFF, OFF, RR and LL for the board number 0, board number 1, board number 2 and board number 3, respectively.

Figure 25:
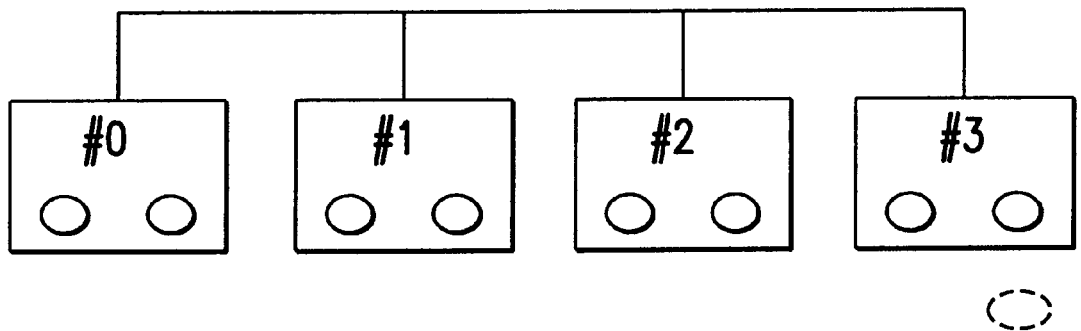
FIG. 25 is another conceptual view illustrating the global pan of a game communication system according to the third embodiment of the invention.

A global pan data RR (FIG. 26) is used to position the pan at the right end of the rightmost gaming machine unit, as indicated by the dotted line in FIG. 25. As shown in FIG. 26, the board number data associated with the global pan data RR indicate OFF, OFF, OFF and RR for the board number 0, board number 1, board number 2 and board number 3, respectively.

Figure 20:
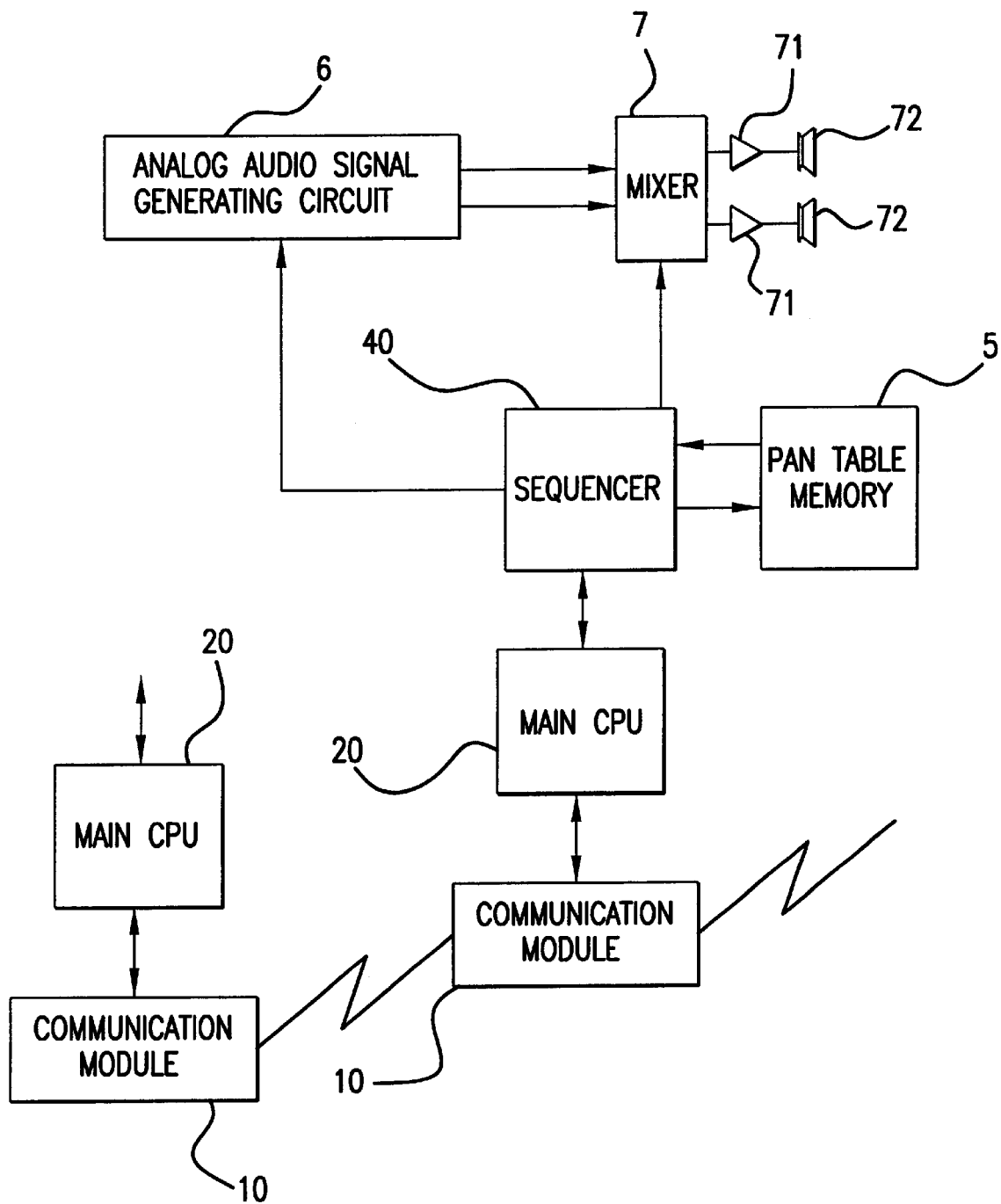
FIG. 20 depicts a block diagram illustrating essential configurations of a game communication system according to a third embodiment of the invention.

FIG. 20 depicts a block diagram illustrating essential configurations of the game communication system according to the third embodiment of the invention. FIGS. 27 through 31 are schematic representations of the local pan table used in the third embodiment of the invention.

As shown in FIG. 20, the printed circuit board mounted in the gaming machine unit includes a communication module 10, a main CPU 20, a sequencer 40, a pan table memory 5, an analog audio signal generating circuit 6 and a mixer 7. An amplifier 71 and a speaker 72 are connected to the mixer via lead lines. Communication module 10 corresponds to the communication unit while sequencer 40 corresponds to performance control unit. Pan table memory 5 corresponds to pan data generating unit while the combination of analog audio signal generating circuit 6 and mixer 7 corresponds to the performance unit. Configurations of these components are described schematically below.

Communication module 10 stores a communication protocol which administers data communication among the printed circuit boards. Communication module 10 may be provided as, for example, a common module on which the communication protocols are stored for both a master printed circuit board and slave printed circuit boards.

Main CPU 20 controls the entire gaming machine units by controlling communication management, gaming procedure and game status management and operation of sequencer 40. Main CPU 20 controls operations carried out by sequencer 40 by means of commands. More specifically, CPU 20 supplies ID numbers to sequencer 40.

Main CPU 20 carries out the automatic master-slave allocation routine. When the entire system is energized with the printed circuit boards being associated with each other via communication lines, the master-slave allocation routine stored on the printed circuit board is performed to establish a master mode of a subsequent communication operation at the gaming machine unit which has received a token first and establish a slave mode of communication at the remaining gaming machine units. In this third embodiment, the description is made with the assumption that the master and slaves for the communication operation are the master and slaves, respectively, for a sound track performance operation. However, the invention is not limited to the above-mentioned configuration. The master for the communication operation may be used as a slave for the sound track performance operation. In such a case, main CPU 20 sets the master or slaves for the sound track performance operation.

Main CPU 20 is connected to two control panels, a coin throw sensor, and a start button, which are not shown in the figure.

Sequencer 40 includes a CPU (not shown) and is directed to control analog audio signal generating circuit 6. Sequencer 40 also includes a RAM (not shown) which is used as a program working area. Sequencer 40 controls the performance of the sound tracks by reading out of pan table memory 5 the pan table corresponding to the ID number determined by main CPU 20. Pan data memory 5 is achieved by, for example, storing the local pan tables shown in FIGS. 27 through 31 in the ROM. The local pan tables in FIGS. 27 through 31 each has ID numbers, balance data and volume data.

The ID number identifies the printed circuit board during the operation carried out by main CPU 20. For example, the ID numbers are assigned to the printed circuit boards in correspondence with the positions where the gaming machine units are installed in a game arcade. As shown in FIG. 21, the #0 of the ID number is assigned to the printed circuit board in the leftmost gaming machine unit after all four of the gaming machine units are installed in the game arcade. In the third embodiment, it is assumed that #0 is assigned to the printed circuit board bearing the number 0. The #1 of the ID number is assigned to the printed circuit board in the second gaming machine unit from the left after all four of the gaming machine units are installed in the game arcade. In the third embodiment, it is assumed that the

1 is assigned to the printed circuit board bearing the number 1. The #2 of the ID number is assigned to the printed circuit board in the second gaming machine unit from the right after all four of the gaming machine units are installed in the game arcade. In the third embodiment, it is assumed that the #2 is assigned to the printed circuit board bearing the number 2. The #3 of the ID number is assigned to the printed circuit board in the rightmost gaming machine unit after all four of the gaming machine units are installed in the game arcade. In the third embodiment, it is assumed that the #3 is assigned to the printed circuit board bearing the number 3.

The local pan table illustrated in FIG. 27 is the table for use in determining a local pan corresponding to the global pan data LL in FIG. 26 and is the pan means for determining the audio balance of the right and left speaker channels as well as the volume of these speaker channels.

The local pan table is used as the local pan by setting the audio balance and the volume of the speaker channels for each gaming machine unit as identified by the ID number.

The local pan table shown in FIG. 27 indicates that LL and 100% are set as the audio balance and volume, respectively, to the gaming machine unit bearing the #0 and OFF is set as the audio balance and volume to the gaming machine units which bear the #1, #2 and #3. The OFF for the audio balance is set when no local pan is produced. The "OFF" volume is equivalent to the situation where no local pan is produced. The term "OFF" is thus used to indicate that any value may be set to the audio balance.

The local pan table illustrated in FIG. 28 is the table for use in determining a local pan corresponding to the global pan data L in FIG. 26. This local pan table indicates that RR and 100% are set as the audio balance and volume, respectively, to the gaming machine unit bearing the #0, LL and 100% are set as the audio balance and volume, respectively, to the gaming machine unit bearing the #1, and OFF is set as the audio balance and volume to the gaming machine units bearing the #2 and #3.

The local pan table illustrated in FIG. 29 is the table for use in determining a local pan corresponding to the global pan data C in FIG. 26. This local pan table indicates that OFF is set as the audio balance and volume to the gaming machine unit bearing the #0, RR and 100% are set as the audio balance and volume, respectively, to the gaming machine unit bearing the #1, LL and 100% are set as the audio balance and volume, respectively, to the gaming machine unit bearing the #2, and OFF is set as the audio balance and volume to the gaming machine unit bearing the #3.

The local pan table illustrated in FIG. 30 is the table for use in determining a local pan corresponding to the global pan data R in FIG. 26. This local pan table indicates that OFF is set as the audio balance and volume to the gaming machine units bearing the #0 and #1, RR and 100% are set as the audio balance and volume, respectively, to the gaming machine unit bearing the #2, and LL and 100% are set as the audio balance and volume, respectively, to the gaming machine unit bearing the #3.

The local pan table illustrated in FIG. 31 is the table for use in determining a local pan corresponding to the global pan data RR in FIG. 26. This local pan table indicates that OFF is set as the audio balance and volume to the gaming machine units bearing the #0, #1 and #2, and RR and 100% are set as the audio balance and volume, respectively, to the gaming machine unit bearing the #3.

The volume 100% indicates that normal volume is determined for a single player on a team including, for example, four players. The volume 70% indicates that a sound track is performed at 70% of the normal volume to the players' ears. The normal volume is adjusted depending on the environment where the game communication system is installed.

In the third embodiment, pan data memory 5 is illustrated and described as the pan data generating unit. However, the invention is not limited thereto. A storage unit may be used instead of the pan data memory for storing function programs adapted to generate the balance and volume data associated with the individual local pan data, with arguments of the ID numbers, the global pan data, and the number of speaker channels. With this configuration, any local pan data may be set for each gaming machine unit. In addition, the local pan may be achieved depending on the number of the printed circuit boards included in the game communication system.

In the above mentioned third embodiment, pan table memory 5 is connected to sequencer 40 and analog audio signal generating circuit 6 includes the above-mentioned PCM sound source, performance data memory and tone data memory. However, the invention is not limited thereto.

For example, analog audio signal generating circuit 6 may supply to mixer 7 an analog audio signal obtained by means of converting a digital audio signal to an analog audio signal reproduced from a compact disk. With such a configuration, analog audio signal generating circuit 6 is controlled by main CPU 20. Therefore, pan table memory 5 is connected to main CPU 20. Main CPU 20 then supplies the balance data and volume data from the local pan table to sequencer 40.

Analog audio signal generating circuit 6 includes, for example, a PCM sound source, a performance data memory, a tone data memory and a D/A converter. Analog audio signal generating circuit 6 with this configuration converts a digital sound data synthesized from tone data based on performance data into an analog audio data and supplies it to mixer 7.

The tone data memory may store sampled data such as sound data obtained by sampling the sounds of a piano or a violin. Alternatively, the tone data memory may store data obtained by sampling sound effects such as sounds of waves, raindrops or animal boom. Mixer 7 supplies analog audio signal to amplifier 71. The audio signal amplified by amplifier 71 is reproduced through speaker 72. The sounds are stereophonically reproduced through two pairs of amplifiers 71 and speakers 72.

According to the above-mentioned third embodiment, the sound fields available in the entire game communication system provide good spatial effects from the productive viewpoints. For example, when movies, films and/or demonstrations are displayed on the gaming machine units in a non-play mode, the gaming machine will attract the passerby.

In addition, when the participating players encounter a certain event (e.g., a jet plane passes by a cartoon in the gaming field during the game play) simultaneously in the same gaming field during the game play, the depth of the gaming field can be produced acoustically as a sound effect by moving the local pan as shown in FIGS. 21 through 25 in that order.

A modification of the third embodiment is described with reference to FIG. 32. This modification is similar to the configuration of the third embodiment described above. Therefore, only the differences from the third embodiment are described.

FIG. 32 is a view illustrating another example of the global pan table. The global pan table illustrated in FIG. 32 is designed for a game communication system including two gaming machine units. The global pan table has board number data and global pan data. The board number data are set to the printed circuit boards mounted in the two gaming machine units. The global pan data is used for setting the pan in the single sound field formed of sound fields provided in each stereo system in the two gaming machine units. According to the third embodiment, a cleaner sound effect can be provided from the productive viewpoint by providing the single sound field with good special effects in the entire game communication system.

What is claimed is:

1. A game communication system comprising gaming machine units connected to each other through a first communication link, the first communication link is adapted to perform a communication procedure within the game communication system, each of the gaming machine units comprises:

a second communication link adapted to execute the communication procedure to ensure bi-directional communications among the gaming machine units;

performance means for performing a sound track for a corresponding gaming machine unit; and synchronization data setting means for setting a synchronization data which is used to control operation timing of said performance means.

2. A game communication system as claimed in claim 1, wherein the synchronization data is obtained by subtracting a delay time due to communication from a counter value and based on a performance status in said performance means.

3. A game communication system as claimed in claim 1, wherein each of the gaming machine units further comprises memorizing means for storing a performance data and a tone data.

4. A game communication system as claimed in claim 3, wherein said memorizing means stores a performance data train which forms the sound track, and said game communication system further comprises:

memory control means adapted to access said memorizing means from a position corresponding to the synchronization data produced by said synchronization data setting means.

5. A game communication system as claimed in claim 1, wherein each of the gaming machine units further comprises mode allocating means for allocating either a master mode or a slave mode to the gaming machine units in said game communication system.

6. A game communication system as claimed in claim 4, wherein the performance data train is separated into predetermined data length segments, each segment comprising a label associated therewith, and said game communication system further comprises:

correspondence table memorizing means for storing a correspondence table including the synchronization data set by said synchronization data setting means and the labels associated with the performance data train; and label selecting means for selecting a label indicative of a start position where performance of the sound track is initiated, said label selecting means selecting the label in accordance with the synchronization data set by said synchronization data setting means and a counter value defined in the correspondence table read out of said correspondence table memorizing means.

7. A game communication system as claimed in claim 6, wherein the gaming machine unit which is determined as the master by said mode allocating means counts a track time for the sound track by every one frame unit.

8. A game communication system as claimed in claim 6, wherein the performance data train is separated into the plurality of segments in such a manner that each segment has a data length corresponding to a half measure or one third measure of a musical note of the sound track used.

9. A game communication system as claimed in claim 3, further comprising downloading means for downloading and receiving the tone data from an external storage device.

10. A game communication system comprising gaming machine units connected to each other through a first communication link, the first communication link adapted to perform a communication procedure within the game communication system, each of the gaming machine units comprises:

memorizing means for storing sound tracks;

a second communication link adapted to execute the communication procedure to ensure bi-directional communications among the gaming machine units;

performance means for performing a sound track for a corresponding gaming machine unit;

status detecting means for detecting a game status for a local gaming machine unit where said status detecting means is located; and memory control means connected to said status detecting means, said memory control means adapted to select a sound track from said memorizing means based on the game status indicated by a signal supplied from said status detecting means.

11. A game communication system as claimed in claim 10, wherein said performance means comprises volume adjusting means for adjusting the volume based on the number of players participating in a game in said game communication system.

12. A game communication system as claimed in claim 11, wherein said performance means keeps the volume at a fixed level independent of the number of players participating in the game in said game communication system.

13. A game communication system as claimed in claim 12, wherein two or more gaming machine units perform the sound track simultaneously.

14. A game communication system, comprising:

gaming machine units connected to each other through a communication link;

performance means for performing a sound track for a corresponding gaming machine unit;

pan data generating means for generating a pan data which is used to achieve a global pan based on the number of said gaming machine units included in said game communication system; and performance control means for controlling said performance means in accordance with the pan data generated by said pan data generating means.

15. A game communication system as claimed in claim 14, wherein said pan data generating means generates a local pan table for each of said gaming machine units which is identified by an ID number.

16. A game communication system as claimed in claim 14, wherein said pan data generating means generates a data for use in achieving a local pan relating to local pan data, arguments of ID numbers, global pan data and number of speaker channels.

17. A game communication system as claimed in claim 15, wherein the pan data includes a balance data and volume data which are used for achieving the local pan in a stereo sound field in a corresponding gaming machine unit.

18. A game communication system comprising gaming machine units connected to each other through first communication modules, the first communication modules adapted to perform a communication procedure within the game communication system, each of the gaming machine units comprises:

second communication modules adapted to execute the communication procedure to ensure bi-directional communications among the gaming machine units;

signal generating circuits performing a sound track for a corresponding gaming machine unit; and synchronization data setting means for setting a synchronization data which is used to control operation timing of said signal generating circuits.

19. A game communication system comprising gaming machine units connected to each other through a first communication link, the first communication link is adapted to perform a communication procedure within the game communication system, each of the gaming machine units comprises:

a second communication link adapted to execute the communication procedure to ensure bi-directional communications among the gaming machine units;

a performance unit performing a sound track for a corresponding gaming machine unit; and a synchronization data setting unit setting a synchronization data which is used to control operation timing of said performance unit.

20. A game communication system comprising gaming machine units connected to each other through a first communication link, the first communication link adapted to perform a communication procedure within the game communication system, each of the gaming machine units comprises:

a memory storing sound tracks;

a second communication link adapted to execute the communication procedure to ensure bi-directional communications among the gaming machine units;

a performance unit performing a sound track for a corresponding gaming machine unit;

a status detecting unit detecting a game status for a local gaming machine unit where said status detecting unit is located; and a memory control unit connected to said status detecting unit, said memory control unit adapted to select a sound track from said memory based on the game status indicated by a signal supplied from said status detecting unit.

21. A game communication system, comprising:

gaming machine units connected to each other through a communication link;

a performance unit performing a sound track for a corresponding gaming machine unit;

a pan data generating unit generating a pan data which is used to achieve a global pan based on the number of said gaming machine units included in said game communication system; and a performance control unit controlling said performance unit in accordance with the pan data generated by said pan data generating unit.

* * * * *